(12) United States Patent
Fujita

(10) Patent No.: US 8,027,062 B2
(45) Date of Patent: Sep. 27, 2011

(54) IMAGE FORMING APPARATUS

(75) Inventor: Sadao Fujita, Tokyo (JP)

(73) Assignee: Canon Kabushiki Kaisha (JP)

( * ) Notice: Subject to any disclaimer, the term of this patent is extended or adjusted under 35 U.S.C. 154(b) by 514 days.

(21) Appl. No.: 12/329,604

(22) Filed: Dec. 7, 2008

(65) Prior Publication Data

US 2009/0147289 A1 Jun. 11, 2009

(30) Foreign Application Priority Data

Dec. 7, 2007 (JP) ................................. 2007-317213

(51) Int. Cl.
*H04N 1/60* (2006.01)
*G03F 3/08* (2006.01)
*G03G 15/00* (2006.01)

(52) U.S. Cl. ............ 358/1.9; 358/504; 358/518; 399/49

(58) Field of Classification Search .................. 358/1.9, 358/504, 518; 399/49, 44, 15
See application file for complete search history.

(56) References Cited

U.S. PATENT DOCUMENTS

| | | | | |
|---|---|---|---|---|
| 5,294,959 A * | 3/1994 | Nagao et al. | .................... | 399/44 |
| 6,434,347 B2 * | 8/2002 | Nakayasu | ....................... | 399/49 |
| 7,292,798 B2 * | 11/2007 | Furukawa et al. | .............. | 399/49 |
| 7,450,866 B2 * | 11/2008 | Sato | ................................ | 399/15 |
| 2004/0131371 A1 | 7/2004 | Itagaki et al. | | |

FOREIGN PATENT DOCUMENTS

| | | |
|---|---|---|
| JP | 9-233350 A | 9/1997 |
| JP | 2001-260407 A | 9/2001 |
| JP | 2004-45903 A | 2/2004 |
| JP | 2004-205701 A | 7/2004 |
| JP | 2006-189789 A | 7/2006 |

* cited by examiner

*Primary Examiner* — Charlotte M Baker

(74) *Attorney, Agent, or Firm* — Rossi, Kimms & McDowell LLP

(57) ABSTRACT

An image forming apparatus which is capable of eliminating influence of in-plane variation contained in secondary-color patches, which is caused by devices, in performing gradation correction. A first toner pattern having a uniform density (of gray) and a second toner pattern having gradation (of gray and black) are formed in a direction orthogonal to a direction of driving an image bearing member. Gradation correction data for converting an input image signal associated with the toner of black is formed, based on density information on the second toner pattern formed by the two toners, and density information on the second toner pattern formed by the toner of gray.

2 Claims, 20 Drawing Sheets

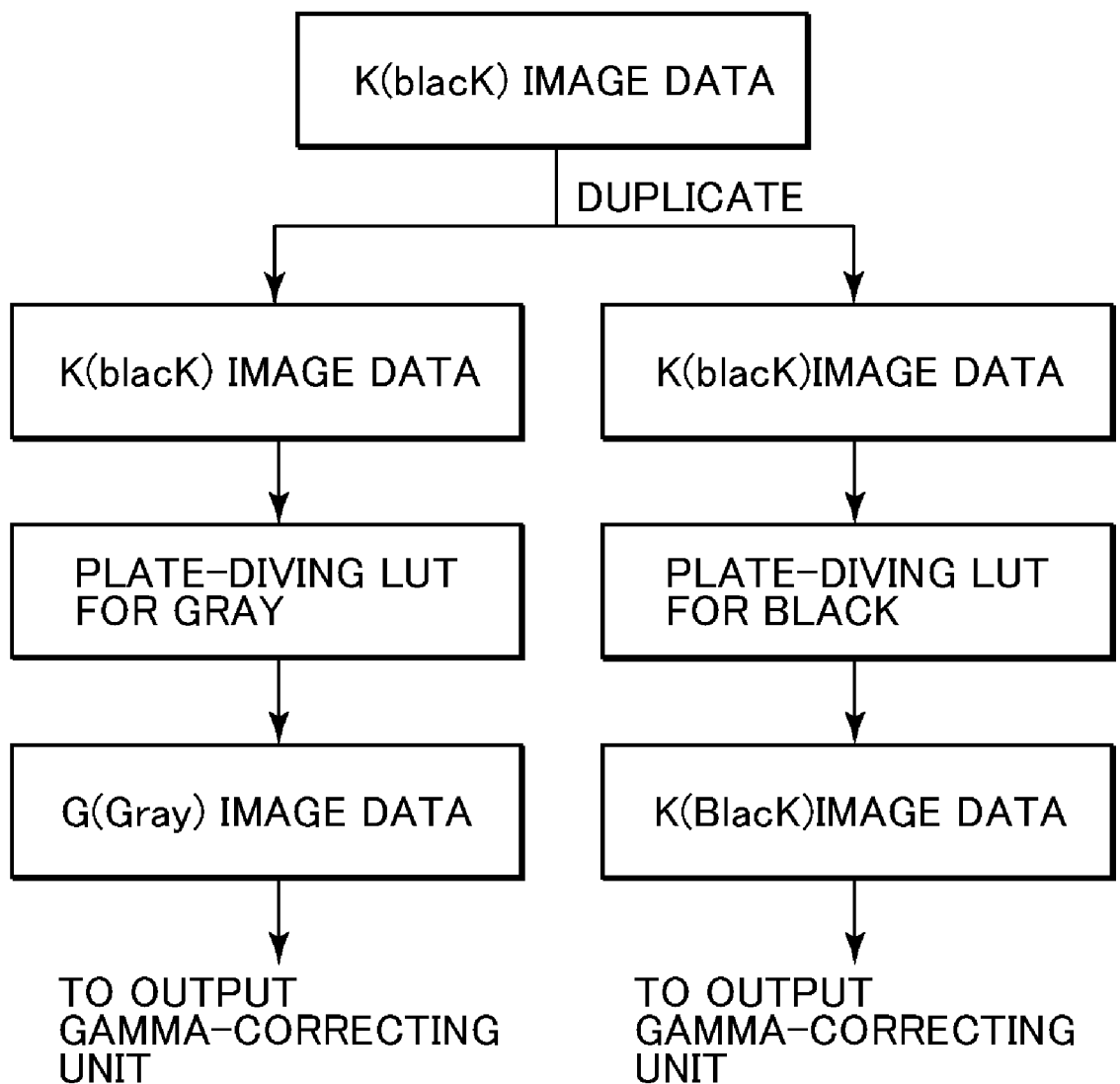

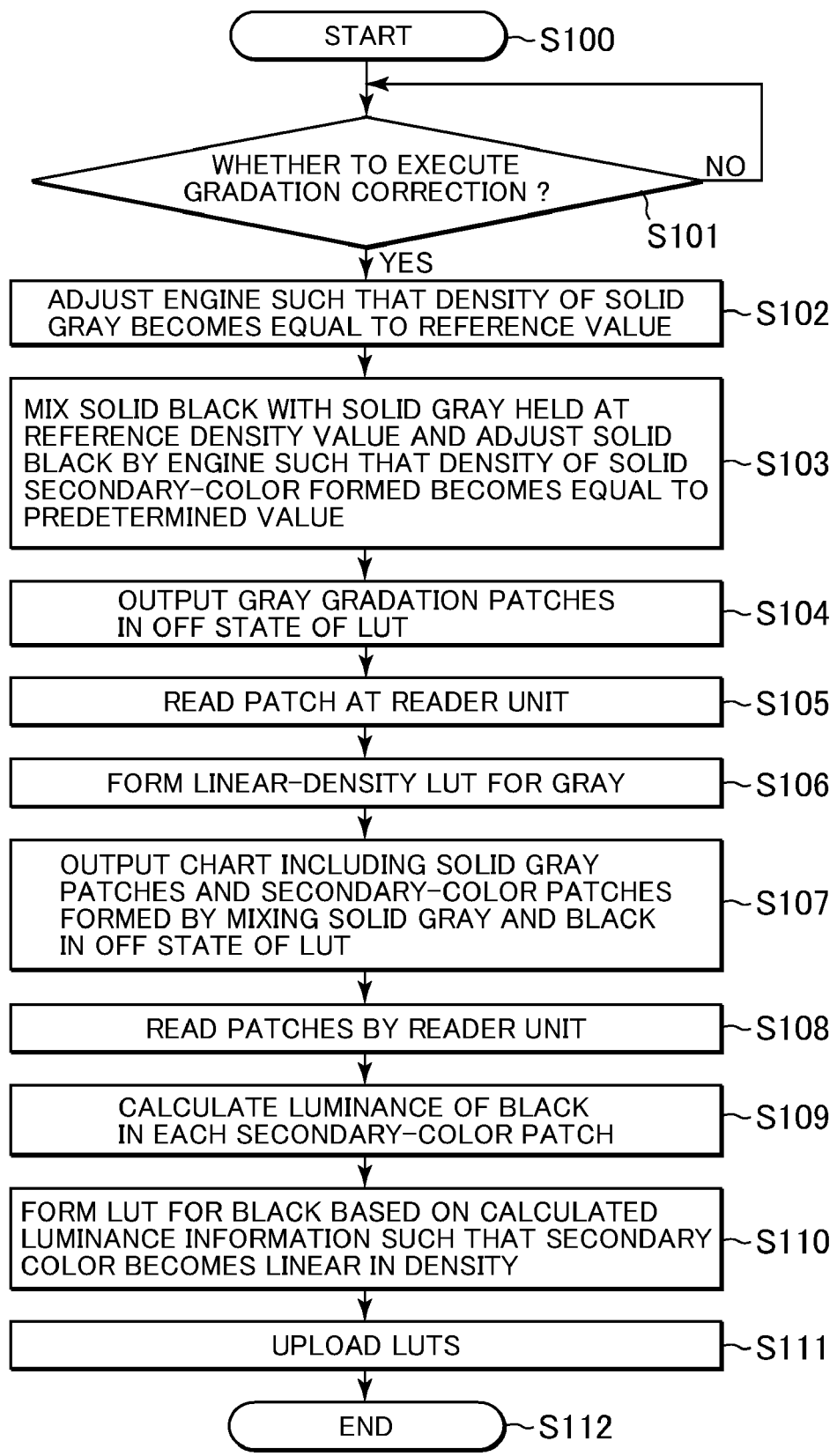

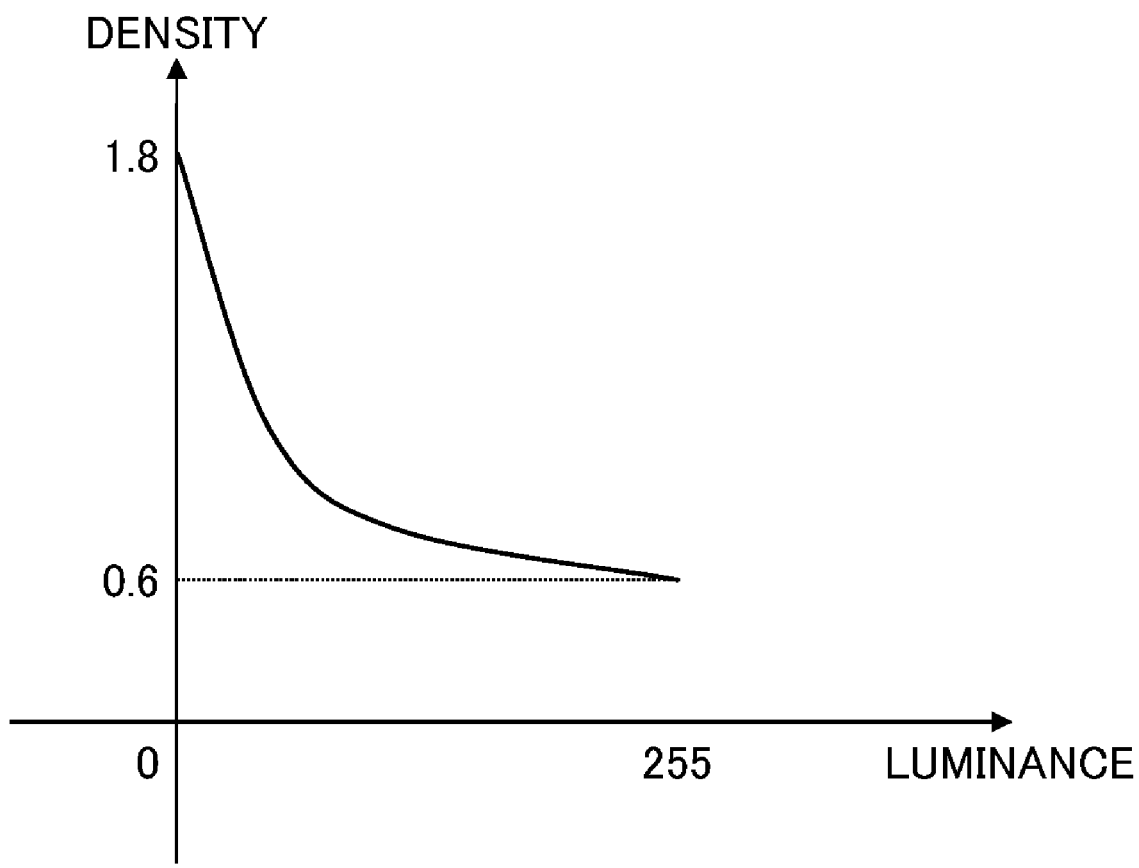

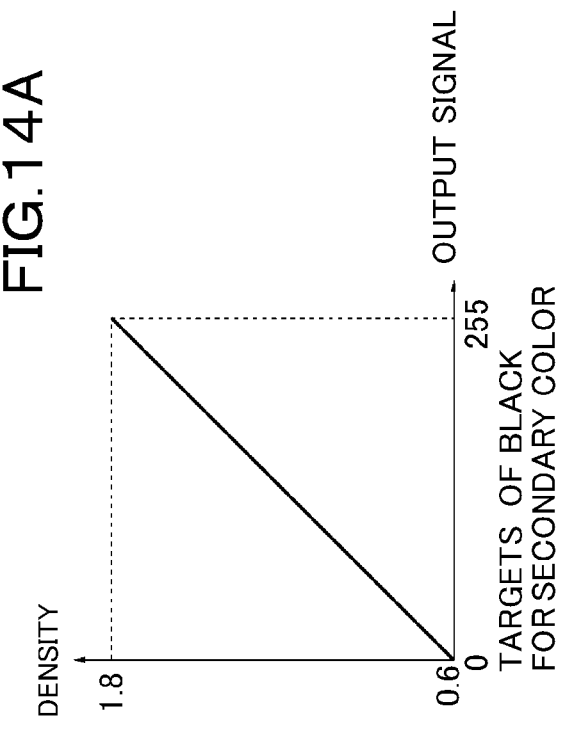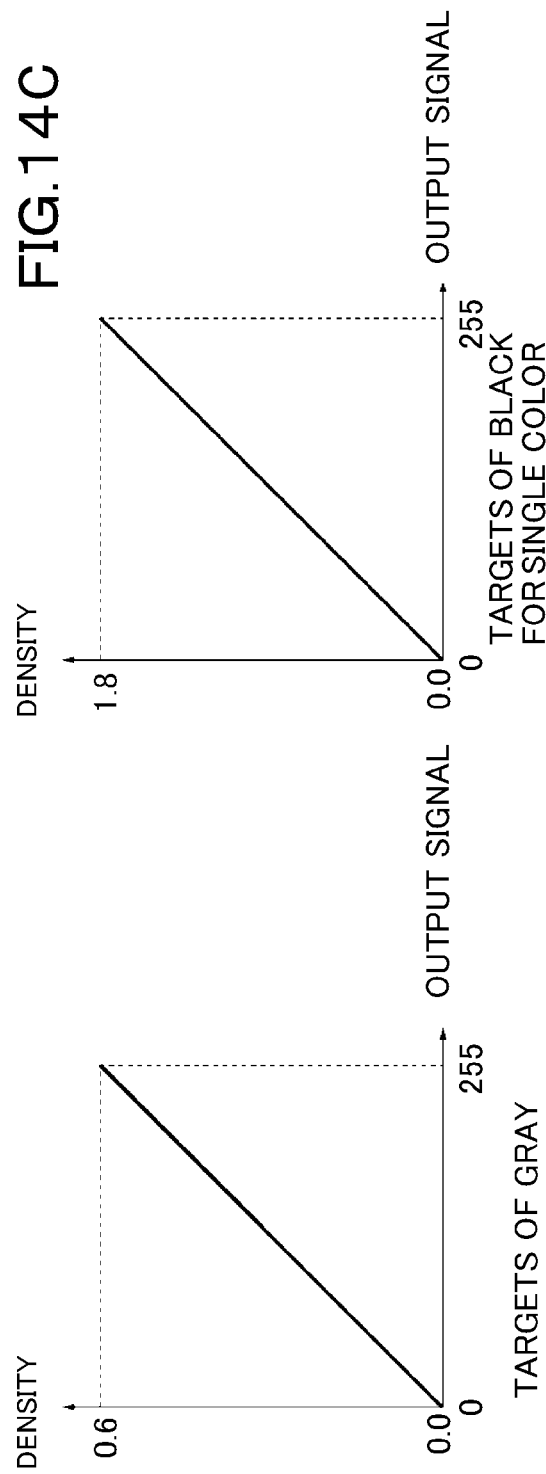

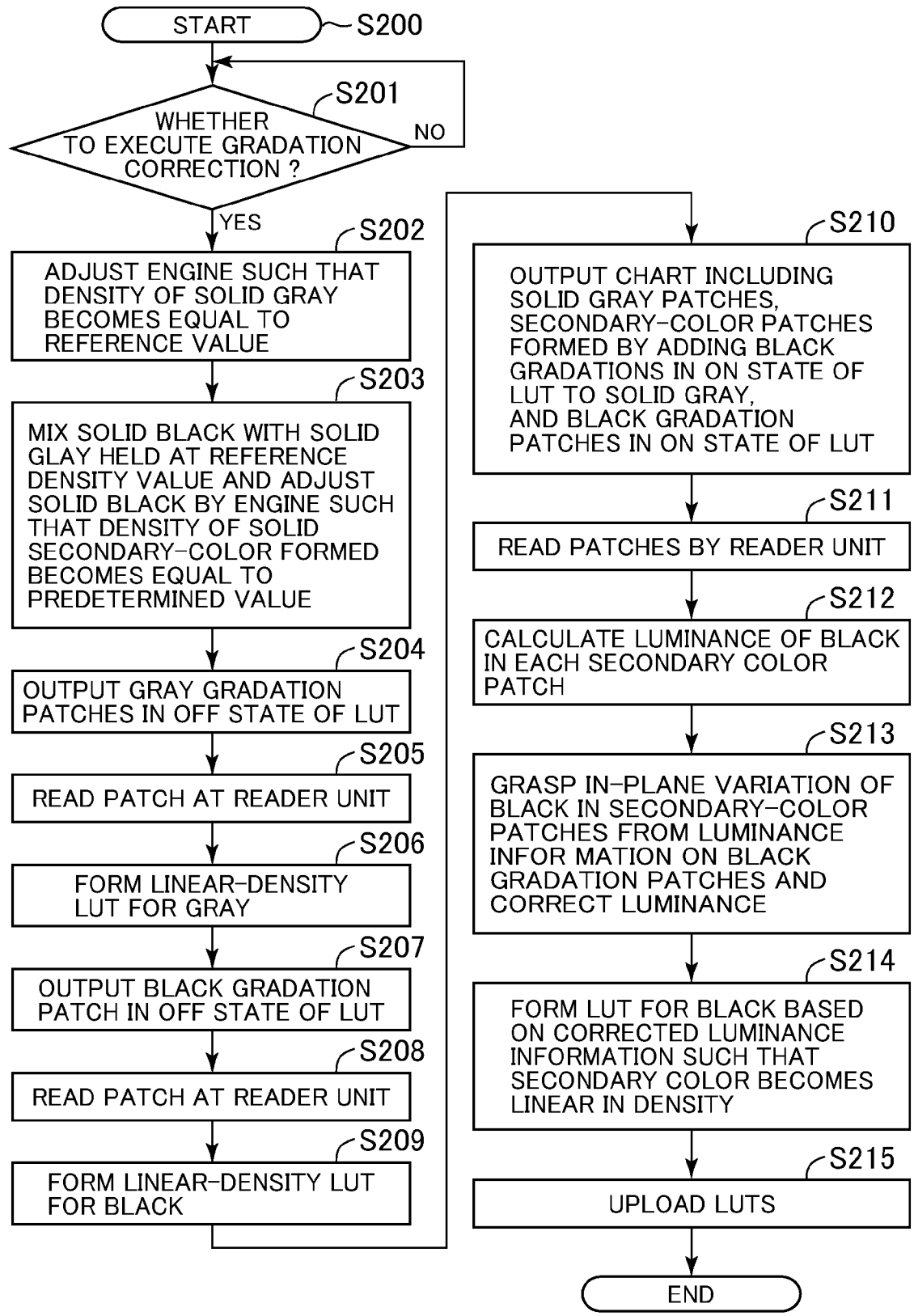

IMAGE FORMING APPARATUS

BACKGROUND OF THE INVENTION

1. Field of the Invention

The present invention relates to an image forming apparatus, such as a printer, which performs image formation by superimposing a toner of a first color and a toner of a second color that has the same hue as that of the first color an a density higher than that of the first color, one upon the other.

2. Description of the Related Art

In an image forming apparatus by electrophotography, there occurs a case where the gradation of an input image and that of an actually output image do not match. This is because image formation is performed under the influences of the reading characteristics of an image reader element, such as a CCD (Charge Coupled Device), used in an image reading section, the electrostatic charging characteristics, developing characteristics, transfer characteristics, fixing characteristics, and so forth of an image forming section. Therefore, in the electrophotographic image forming apparatus, to cause the gradation of the input image to match that of the actually output image, the signal of the input image is converted using gradation correction data, such as a gamma lookup table (hereinafter also referred to as "the LUT") (gradation correction). The LUT is a table associating an input image signal and an output image signal with each other. The input image signal is converted based on the LUT. If image formation is performed based on the converted image signal, the image is output at a desired gradation.

The characteristics of the apparatus change with the lapse of time and changes in the environment, and hence the gradation of an output image change with changes in the apparatus. To maintain the gradation of the output image, it is necessary to correct the gradation correction data. As the method of correcting the gradation correction data, there is one proposed in Japanese Patent Laid-Open Publication No. H09-233350.

In this data correction method, gradation patches (small areas varying from light to dark) of an object color are formed on a recording medium, and the luminance of each patch is read by a scanner or the like and is converted into a density of the patch. Then, a gradation correction table is formed such that the densities of the read patches form a desired curve.

However, the apparatus that performs image formation using a dark toner and a light toner sometimes suffers from the problem that even if the above-described gradation correction data is corrected, the correction is not accurate enough.

FIGS. 22A and 22B are graphs showing how a gradation step is caused in a gradation characteristic curve of gradation expression using a dark toner and a light toner.

The dark toner and the light toner have the same hue and different densities. Colors having the same hue means that the colors belong to substantially the same color classification, such as black or yellow.

The apparatus that uses a dark toner and a light toner performs image formation in a low-density area using only the light toner. Further, from a certain density area, image formation is performed using a mixture of the light and dark toners. By using the light toner, it is possible to restrict the sense of graininess of an image (particularly in a low-density area), which makes it possible to improve image quality.

Assuming that gradation correction is performed on the dark toner and the light toner such that they have target gradation characteristics as shown in FIG. 22A, respectively, and the toners are mixed, a gradation characteristic curve indicative of the gradation characteristics of the mixture becomes an ideal one as shown by a broken line W1 in a FIG. 22B graph on condition that the image forming apparatus is in an ideal state.

However, when performing gradation correction, the above-mentioned characteristics of the apparatus are sometimes changed to be no longer properly associated with the LUT due to aging of the aging of transfer members and degradation of developers. As a consequence, a gradation characteristic curve of the obtained gradation characteristics of the mixture is sometimes not the above-described ideal one but has a gradation step as appearing in a solid line W2 in the FIG. 22B graph. To suppress such a step, it is necessary to directly detect patches formed by a mixture of the dark toner and the light toner (hereinafter the mixture is referred to as the "dark/light toner"), and form a LUT which is capable of correcting the gradation characteristics of the light toner, and that of a color formed by the dark/light toner. When the dark/light toner is considered to be composed of toners of types different from each other, this correction of the gradation correction data can be considered as correction which attaches importance to the gradation characteristics of a secondary color that is formed by superimposing the dark toner and the light toner one upon another.

A method of correcting gradation correction data of a secondary color has been proposed e.g. in Japanese Patent Laid-Open Publication No. 2004-205701. In the method disclosed in this publication, matrix patches of secondary colors, which are output in a state not subjected to gradation correction, are read and its chromaticity of each of the read colors is calculated. Then, the calculated chromaticity is converted to hue information and chroma information of primary colors equivalent to the secondary color to thereby calculate combinations of primary colors that correspond to secondary colors that have a fixed hue angle and are increased in chroma at fixed intervals. The thus determined combination is caused to be reflected on a LUT for a single color, whereby it is possible to realize gradation correction for suppressing variation in hue of secondary colors.

However, the correction of gradation correction data by the method disclosed in Japanese Patent Laid-Open Publication No. 2004-205701 is not accurate, because it is not free from influences of in-plane variation caused by devices used in electrophotography.

Here, a description will be given of the in-plane variation caused by the devices. In the image forming apparatus by electrophotography, it is desirable to form an image in the plane of each sheet of recording medium without variation while maintaining color uniformity, but actually, variations in colors (in-plane variation) are caused in the plane of the recording medium by various devices provided in the image forming apparatus. Examples of the in-plane variation caused by the devices include variation due to the inclination of an in-developer sleeve with respect to a photosensitive member, variation due to the inclination of a charger with respect to the photosensitive member, variation due to the inclination of an intermediate transfer member with respect to the photosensitive member, sensitivity variation in the photosensitive member, variation in the amount of laser light, and so forth.

Toner patches, which are formed during correction of gradation correction data in a manner associated with respective gradations, are formed along the rotating shaft of the photosensitive drum (in a direction orthogonal to the direction of conveyance of the recording medium) and along the direction of rotation of the photosensitive drum (the direction of conveyance of the recording medium). It is considered that when in-plane variation as described above is caused, the method disclosed in Japanese Patent Laid-Open Publication No. 2004-205701 cannot perform accurate correction of gradation correction data since the toner patches are not formed at proper densities due to the in-plane variation.

To eliminate this inconvenience, there has been proposed a gradation correcting method free from the influence of in-plane variation caused by devices, in Japanese Patent Laid-Open Publication No. 2001-260407. In this method, gradation toner patches for forming gradation correction data and an array of patches in the direction of the rotating shaft of the photosensitive drum which are of the same color and with the same output value for grasping in-plane variation are formed in a gradation correction chart, and the densities of all the above patches are measured. Then, in-plane variation is grasped based on obtained information on the densities of the patch array, and based on information on the in-plane variation, density information on the gradation toner patches is corrected by the amount of deviation of the density due to the in-plane variation, whereafter a LUT for object colors is formed based on the corrected density information.

However, the method disclosed in Japanese Patent Laid-Open Publication No. 2001-260407 cannot accurately grasp information on in-plane variation contained in secondary-color patches in the correction of gradation correction data of secondary colors, and therefore it is impossible to perform gradation correction free from the influence of the in-plane variation. For example, when a LUT for a light tone is formed, since toner patches are formed only by the light toner, the LUT can be accurately formed by eliminating the influence of the in-plane variation by the method disclosed in Japanese Patent Laid-Open Publication No. 2001-260407. However, toner patches formed by using the light toner and a dark toner include in-plane variation due to an image forming section of the dark toner and in-plane variation due to an image forming section of the light toner, which makes it impossible to form an accurate LUT without taking both the in-plane variations into account.

SUMMARY OF THE INVENTION

The present invention provides an image forming apparatus which is capable of eliminating influence of in-plane variation contained in secondary-color patches, which is caused by devices, in performing gradation correction in which importance is attached to gradation characteristics of a secondary color formed by a dark/light toner.

In a first aspect of the present invention, there is provided an image forming apparatus that forms an image having a density lower than a predetermined density by using only a toner of a first color while forming an image having a density not lower than the predetermined density by superimposing the toner of the first color and a toner of a second color that has the same hue as that of the first color and has a density higher than that of the first color, one upon the other, comprising an image processing unit configured to convert an input image signal based on gradation correction data so as to adjust gradation of an output image, an image forming unit configured to perform image formation based on an image signal output from the image processing unit, the image forming unit including an image bearing member, a driving unit configured to drivingly rotate the image bearing member, an exposure unit configured to form an electrostatic latent image on the image bearing member, a toner bearing member disposed in opposed relation to the image bearing member and configured to bear a toner, a bias applying unit configured to apply a developing bias to the toner bearing member, and a developing unit configured to develop the electrostatic latent image into a toner image at a density corresponding to a potential difference between the developing bias and a potential of the electrostatic latent image, the image forming unit including a first image-forming section for performing image formation using the toner of the first color and a second image-forming section for performing image formation using the toner of the second color, a control unit configured to cause the image forming sections to form a first toner pattern having a uniform density and a second toner pattern having gradation, in a direction orthogonal to a direction of driving the image bearing member, a reader unit configured to read the first and second toner patterns, a detection unit configured to detect an image density difference occurring in the direction orthogonal to the direction of driving the image bearing member, based on a result of reading of the first toner pattern by the reader unit, a calculation unit configured to calculate density information on the second toner pattern, based on a result of detection by the detection unit and a result of reading of the second toner pattern, and a gradation correction data-forming unit configured to form gradation correction data based on the density information, wherein the gradation correction data-forming unit forms the gradation correction data for converting an input image signal associated with the toner of the second color, based on density information on the second toner pattern formed by the toners of the first color and the second color, and density information on the second toner pattern formed by the toner of the first color.

In a second aspect of the present invention, there is provided an image forming apparatus that forms an image having a density lower than a predetermined density by using only a toner of a first color while forming an image having a density not lower than the predetermined density by superimposing the toner of the first color and a toner of a second color that has the same hue as that of the first color and has a density higher than that of the first color, one upon the other, comprising an image processing unit configured to convert an input image signal based on gradation correction data so as to adjust gradation of an output image, an image forming unit configured to perform image formation based on an image signal output from the image processing unit, the image forming unit including an image bearing member, a driving unit configured to drivingly rotate the image bearing member, an exposure unit configured to form an electrostatic latent image on the image bearing member, a toner bearing member disposed in opposed relation to the image bearing member and configured to bear a toner, a bias applying unit configured to apply a developing bias to the toner bearing member, and a developing unit configured to develop the electrostatic latent image into a toner image at a density corresponding to a potential difference between the developing bias and a potential of the electrostatic latent image, the image forming unit including a first image-forming section for performing image formation using the toner of the first color and a second image-forming section for performing image formation using the toner of the second color, a control unit configured to cause the image forming sections to form a first toner pattern having a uniform density and a second toner pattern having gradation, in a direction orthogonal to a direction of driving the image bearing member, a reader unit configured to read the first and second toner patterns, a detection unit configured to detect an image density difference occurring in the direction orthogonal to the direction of driving the image bearing member, based on a result of reading of the first toner pattern by the reader unit, a calculation unit configured to calculate density information on the second toner pattern, based on a result of detection by the detection unit and a result of reading of the second toner pattern, and a gradation correction data-forming unit configured to form gradation correction data based on the density information, wherein the gradation correction data-forming unit forms the gradation correction data for converting an input image signal associated with the toner of the second color, based on density information on the second toner pattern formed by the toners of the first color and the second color and the image density difference detected by the detection unit of the first toner pattern formed by the toner of the first color.

In a third aspect of the present invention, there is provided an image forming apparatus that forms an image having a density lower than a predetermined density by using only a toner of a first color while forming an image having a density not lower than the predetermined density by superimposing the toner of the first color and a toner of a second color that has the same hue as that of the first color and has a density higher than that of the first color, one upon the other, comprising an image processing unit configured to convert an input image signal based on gradation correction data so as to adjust gradation of an output image, an image forming unit configured to perform image formation based on an image signal output from the image processing unit, the image forming unit including an image bearing member, a driving unit configured to drivingly rotate the image bearing member, an exposure unit configured to form an electrostatic latent image on the image bearing member, a toner bearing member disposed in opposed relation to the image bearing member and configured to bear a toner, a bias applying unit configured to apply a developing bias to the toner bearing member, and a developing unit configured to develop the electrostatic latent image into a toner image at a density corresponding to a potential difference between the developing bias and a potential of the electrostatic latent image, the image forming unit including a first image-forming section for performing image formation using the toner of the first color and a second image-forming section for performing image formation using the toner of the second color, a control unit configured to cause the image forming sections to form a first toner pattern having a uniform density and a second toner pattern having gradation, in a direction orthogonal to a direction of driving the image bearing member, a reader unit configured to read the first and second toner patterns, a detection unit configured to detect an image density difference occurring in the direction orthogonal to the direction of driving the image bearing member, based on a result of reading of the first toner pattern by the reader unit, a calculation unit configured to calculate density information on the second toner pattern, based on a result of detection by the detection unit and a result of reading of the second toner pattern, and a gradation correction data-forming unit configured to form gradation correction data based on the density information, wherein the gradation correction data-forming unit forms the gradation correction data for converting an input image signal associated with the toner of the second color, based on density information on the second toner pattern formed by the toners of the first color and the second color and the image density difference detected by the detection unit of the first toner pattern formed by the toner of the second color.

According to the present invention, it is possible to eliminate influence of variation in colors caused by devices, which is contained in secondary-color patches that are formed by a first color and a second color which have the same hue and are different in density.

The features and advantages of the invention will become more apparent from the following detailed description taken in conjunction with the accompanying drawings.

BRIEF DESCRIPTION OF THE DRAWINGS

FIG. 3 is a functional block diagram of a plate-dividing processing unit shown in FIG. 2.

FIG. 7 is a flowchart of a LUT forming process executed by the image forming apparatus according to the first embodiment.

FIG. 13 is a view of a luminance-density conversion table for the secondary color.

FIGS. 14A, 14B, and 14C are graphs showing targets of gradation characteristics of gray and black, stored in a LUT forming section.

FIG. 15 is a flowchart of a LUT-forming process executed by an image forming apparatus according to a second embodiment of the present invention.

DETAILED DESCRIPTION OF THE EMBODIMENTS

The present invention will now be described in detail below with reference to the accompanying drawings showing embodiments thereof.

Figure 1:
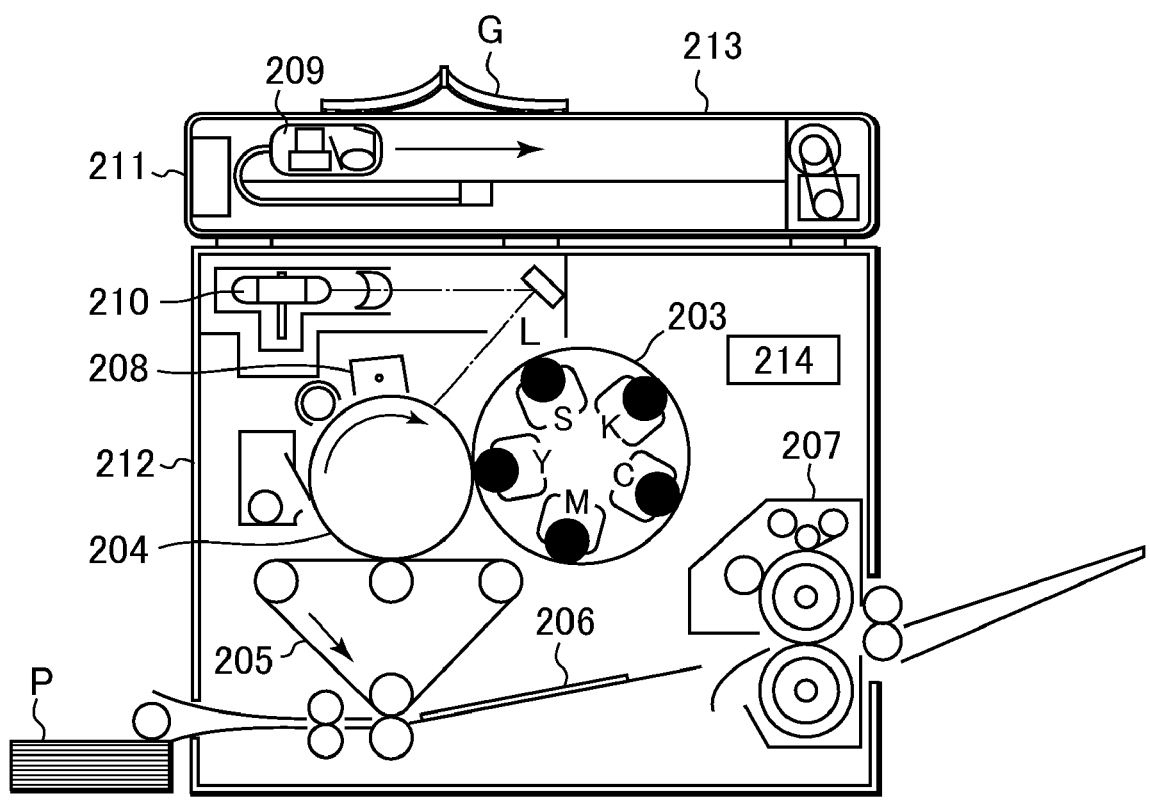
FIG. 1 is a schematic cross-sectional view of an image forming apparatus according to a first embodiment of the present invention.

FIG. 1 is a schematic cross-sectional view of an image forming apparatus according to a first embodiment of the present invention.

In the present embodiment, a description will be given of a case where the image forming apparatus is a digital multi-function apparatus having a plurality of functions of a copying machine, a printer, a facsimile machine, and so forth, by way of example.

The image forming apparatus is comprised of an image reading unit 211 and an image forming unit 212. When a start key of the image forming unit 212 is depressed, a photosensitive drum 204 is charged to a predetermined potential by an electrostatic charger 208.

On the other hand, a reading unit 209, which includes an original-illuminating lamp, a short focus lens array, and a CCD (Charge Coupled Device) sensor 304, scans each sheet of an original G on an original platen glass 213 while irradiating light on the original G. This causes scanning light reflected from surface of the original G to form an image by the short focus lens array, which enters the CCD sensor 304 as an optical signal. The CCD sensor 304 converts the optical signal into an electric signal (analog signal).

The obtained analog signal is subjected to image processing by an image processing unit 300, described hereinafter, and is converted to a digital signal. The digital signal is sent to the image forming unit 212 via a printer control unit 350. The printer control unit 350 generates an ON/OFF signal in response to the digital image signal.

The image forming unit 212 is comprised of the photosensitive drum 204, a rotary developing device 203, an intermediate transfer member 205, a fixing device 207, and a driving device 214 that drivingly rotates the photosensitive drum 204 and the intermediate transfer member 205. The rotary developing device 203 holds a plurality of developing devices each of which contains a so-called two-component developer having toner particles and carrier particles.

The image forming unit 212 forms a first-color electrostatic latent image corresponding to the original image on the surface of the photosensitive drum 204, by a laser exposure unit 210 that scans a laser beam emitted from a solid-state laser element in an ON/OFF manner in response to the above-mentioned ON/OFF signal, by a rotary polygon mirror. Then, the image forming unit 212 develops the electrostatic latent image by a developing device 203Y, which is a first color developing device of the rotary developing device 203, to form a toner image on the photosensitive drum 204.

Each of the developing devices for respective colors is provided with a in-developer sleeve for bearing a toner, and a developing bias-applying device for applying a developing bias to the in-developer sleeve. The in-developer sleeve is a rotary member that extends along a rotating shaft of the photosensitive drum 204, and is disposed in a manner opposed to the photosensitive drum. Each electrostatic latent image on the photosensitive drum 204 is developed as a toner image with density dependent on the potential difference between the developing bias and the electrostatic latent image.

Then, the toner image formed on the photosensitive drum 204 is transferred onto the intermediate transfer member 205. After that, electrostatic latent images are sequentially developed by the developing devices 203M to 203S, to sequentially form toner images of respective colors of magenta, cyan, and black on the photosensitive drum 204. The toner images are transferred onto the intermediate transfer member 205 to be superimposed one upon the other, and then are collectively transferred onto a transfer material 206. After that, the transfer material 206 is conveyed to the fixing device 207, and has the toner image thermally fixed thereon, followed by being discharged from the image forming unit 212.

It should be noted that in the present embodiment, the developing devices 203Y, 203M, 203C, and 203K contained in the respective rotary developing device 203 develop electrostatic latent images by yellow, magenta, cyan, and black toners, respectively. The developing device 203S develops an electrostatic latent image by a gray toner (toner of a first color) having the same hue as that of the black toner (toner of a second color) but a different density from that of the black toner, as a color material of a color other than the above-mentioned four colors.

Next, the image processing unit 300 according to the present embodiment will be described with reference to FIG. 2 and so forth.

Figure 2:
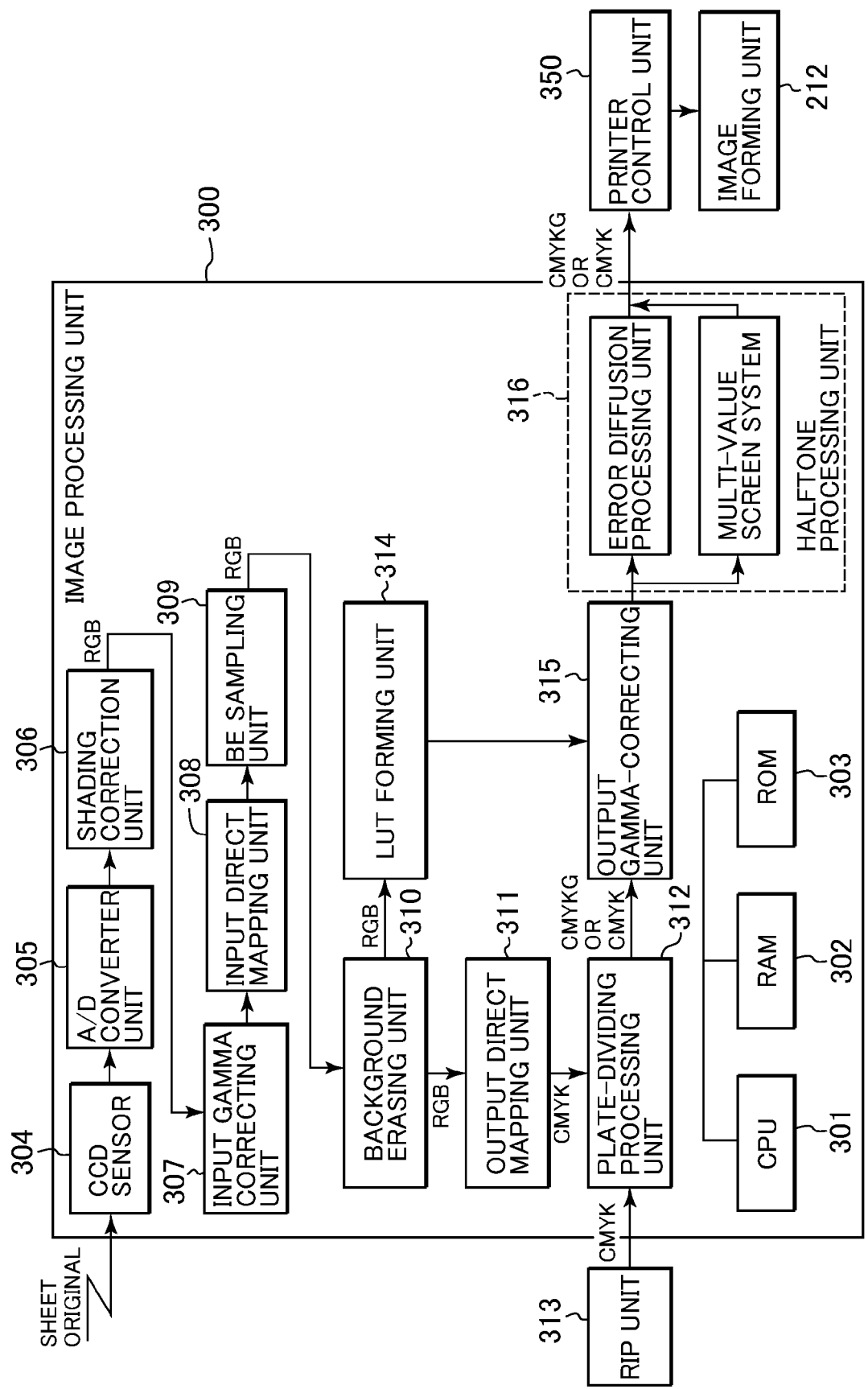
FIG. 2 is a block diagram of an image processing unit.

FIG. 2 is a block diagram of the image processing unit 300. Further, FIG. 3 is a functional block diagram of a plate-dividing processing unit 312 shown in FIG. 2.

Referring to FIG. 2, a CPU 301 performs centralized overall control of component elements of the image processing unit based on control programs stored in a ROM 302, using a RAM 303 as a work memory.

An image read by the image reading unit 211 is converted to an electric signal by the CCD sensor 304. The CCD sensor 304 is an RGB 3-line color sensor, and inputs the image read by the image reading unit 211 to an A/D converter unit 305 as image data of R (red), G (green), and B (blue) colors.

The A/D converter unit 305 performs gain adjustment and offset adjustment of the image data items, and then converts the image data items to digital image data of 8 bits on a color signal-by-color signal basis. A shading correction unit 306 corrects variation in the sensitivity of each pixel of the CCD sensor 304, variation in the amount of light from the original-illuminating lamp, and so forth, on a color-by-color basis, using a read signal generated by reading a reference white board.

An input gamma correcting unit 307 is a one-dimensional LUT that corrects each of input R, G, and B image data items such that the exposure amount of each color and luminance thereof satisfy a linear relationship. An input direct mapping unit 308 is a three-dimensional LUT that converts the input RGB signals to in-device RGB signals so as to form a unified color space.

A BE (Background Erase) sampling unit 309 discretely samples pixels in a designated rectangular area so as to detect a background, forms a histogram of the luminance of the pixels, and uses the histogram for erasing the background during print processing.

A background erasing unit 310 performs nonlinear conversion for erasing a background portion on the RGB image data read by the image reading unit 211, based on the results of sampling performed by the BE sampling unit 309. Then, an output direct mapping unit 311 converts the RGB image data to CMYK image data. To perform this conversion, the output direct mapping unit 311 inputs the values of the respective RGB colors to a lookup table, and forms a C (cyan) component based on the total sum of the output values from the lookup table. Similarly, the respective components of M (magenta), Y (yellow), and K (black) are formed by using lookup tables and performing addition operations of the output values from the lookup tables.

Figure 4B:
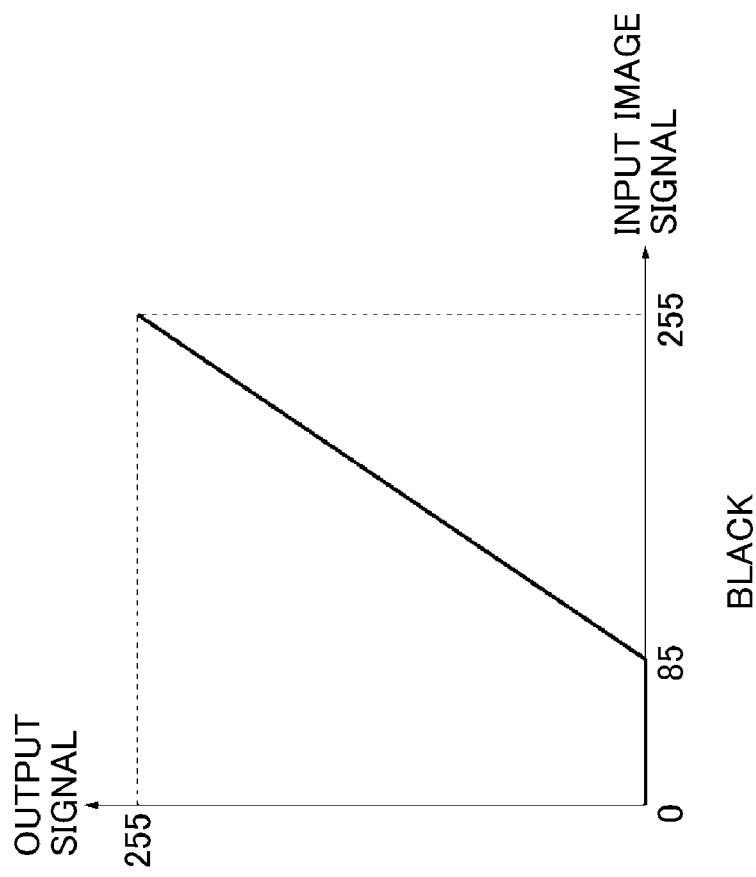
FIGS. 4A and 4B are graphs showing the relationship between an input image signal and an output signal in the plate dividing processing.
Figure 4A:
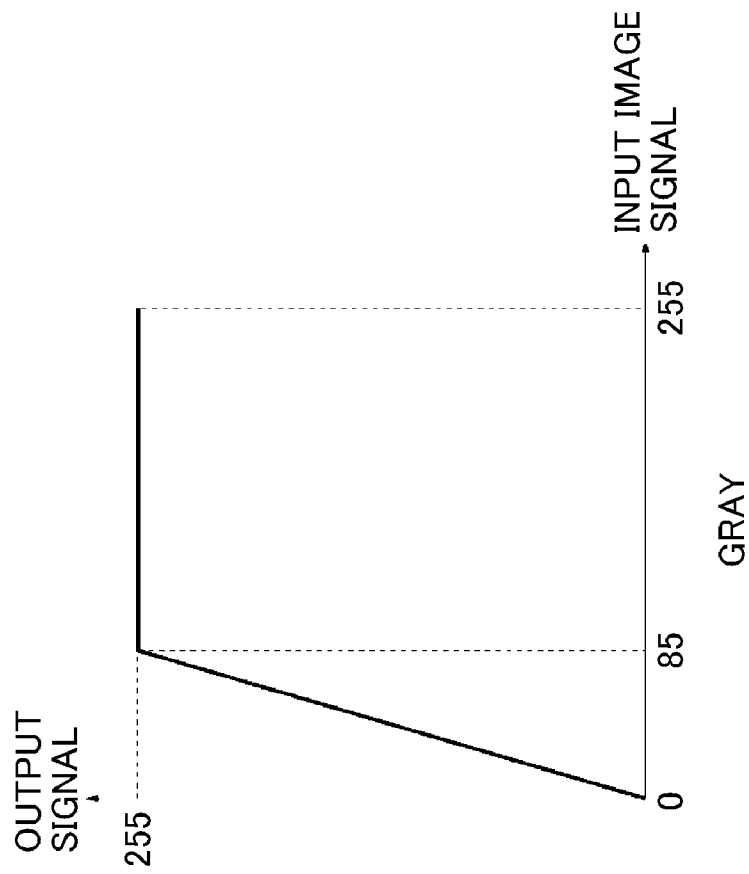

As shown in FIG. 3, the plate-dividing processing unit 312 duplicates K (black) image data out of CMYK image data sent from a RIP unit 313 that carries out rasterizing processing and the output direct mapping unit 311, according to a command from the CPU 301 (as indicated by A1 in FIG. 3). It should be noted that RIP is an abbreviation of Raster Image Processor. Then, the plate-dividing processing unit 312 applies plate-dividing lookup tables for respective colors to the duplicated image data (as indicated by A2), to thereby form G (gray) image data and K (black) image data (as indicated by A3). Referring to FIGS. 4A and 4B, the plate-dividing lookup tables are formed in a manner representing the characteristics of output signals of the respective colors (gray and black) obtained after plate division of a black image signal (input image signal) input to the plate-dividing processing unit 312.

The command that the plate-dividing processing unit 312 receives from the CPU 301 is for determining whether or not the plate-dividing processing unit 312 should perform plate division. In the present embodiment, when the user intends to output an image, the user selects an "image output mode", described hereinafter, on a property screen of a printer driver. Then, the CPU 301 sends a command to the plate-dividing processing unit 312 according to the result of the selection.

The image output mode can be selected by the user, and includes a "secondary color mode" or a "primary color mode". When the user selects the secondary color mode, the CPU 301 sends a command for executing plate division to the plate-dividing processing unit 312. In response to the command received from the CPU 301, the plate-dividing processing unit 312 performs the plate division, and the image forming unit 212 performs image formation using the CMYKG toners.

When the user selects the primary color mode, the CPU 301 sends a command for prohibiting plate division to the plate-dividing processing unit 312. Upon reception of the command from the CPU 301, the plate-dividing processing unit 312 directly outputs CMYK image data input thereto without performing plate division. As a consequence, the image forming unit 212 performs image formation using normal CMYK toners (i.e. without using the gray toner).

The plate-dividing processing unit 312 stores in advance a reference value of the solid density of a secondary color toner and that of the gray toner. In the present embodiment, the solid density of the secondary color toner is 1.8, and that of the gray toner is 0.6. Here, the term "density" is intended to mean a density measured by a status A densitometry using a visual filter, and is obtained by subtracting the density of paper, as a background, from measured density. Upon reception of the command for performing plate division from the CPU 301, the plate-dividing processing unit 312 determines the characteristics of the output signals of gray and black with respect to the input image signal (the image signal of black) using the reference density values.

Figure 5:
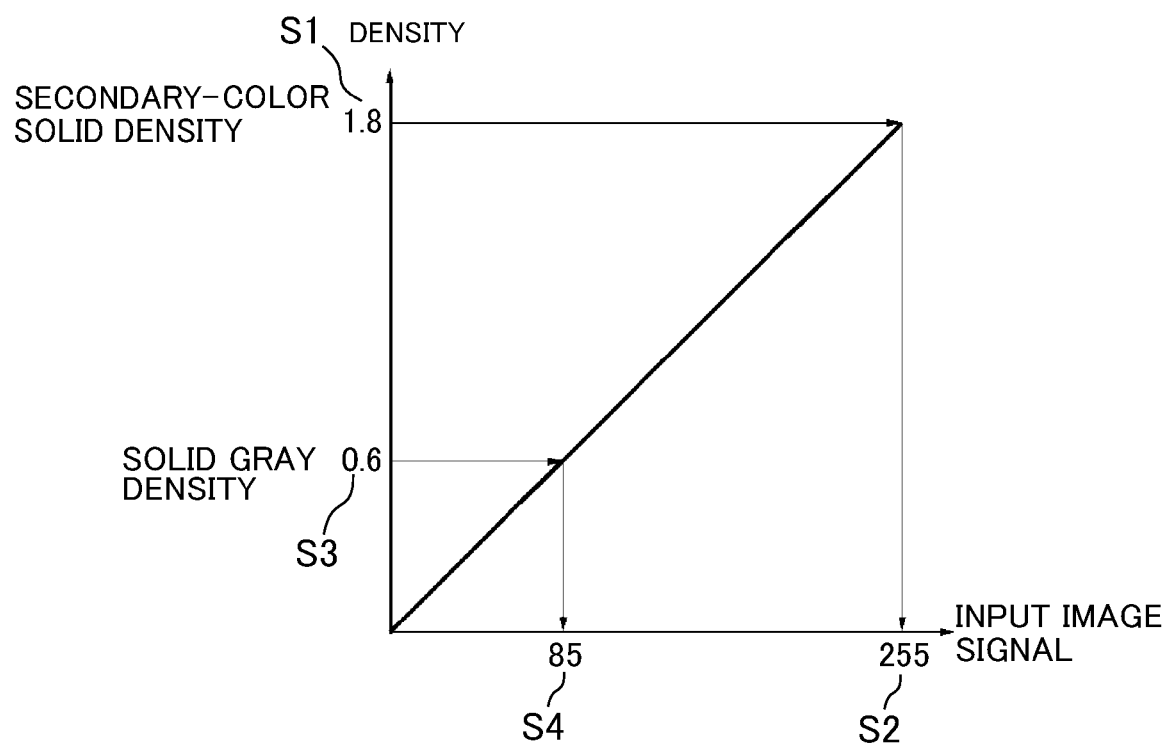
FIG. 5 is a graph showing the relationship between the density of a secondary color formed by a gray toner and a black toner, and the input image signal.

FIG. 5 is a graph showing the relationship between the density of a secondary color formed by the gray toner and the black toner, and the input image signal. As shown in FIG. 5, the plate-dividing processing unit 312 associates the solid density (S1) of the secondary color with a maximum value of the input image signal value (S2), and based on a ratio between the solid density of gray (S3) and that of the secondary color, determines the maximum value of the input image signal when expressing gray using a single color of gray (S4). This determines the characteristics of the output signals of gray and black with respect to the input image signal, as shown in FIGS. 4A and 4B, and the plate division is completed.

A LUT forming section 314 stores in advance target gradation characteristics and a luminance-density conversion table, for each color. Further, the LUT forming section 314 forms a gradation correction table (LUT) of each color, based on RGUB information read by the image reading unit 211, by a gradation correction method executed by the image forming apparatus according to the present embodiment, and uploads the gradation correction table to an output gamma-correcting unit 315.

Figure 6A:
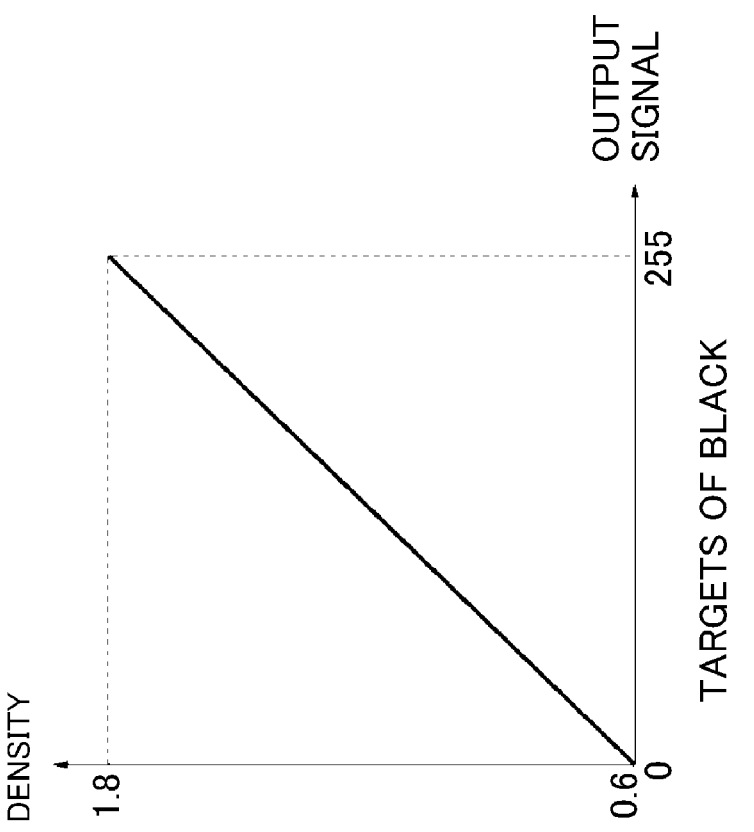
FIGS. 6A and 6B are graphs showing targets of gradation characteristics of the gray toner and the black toner.
Figure 6B:
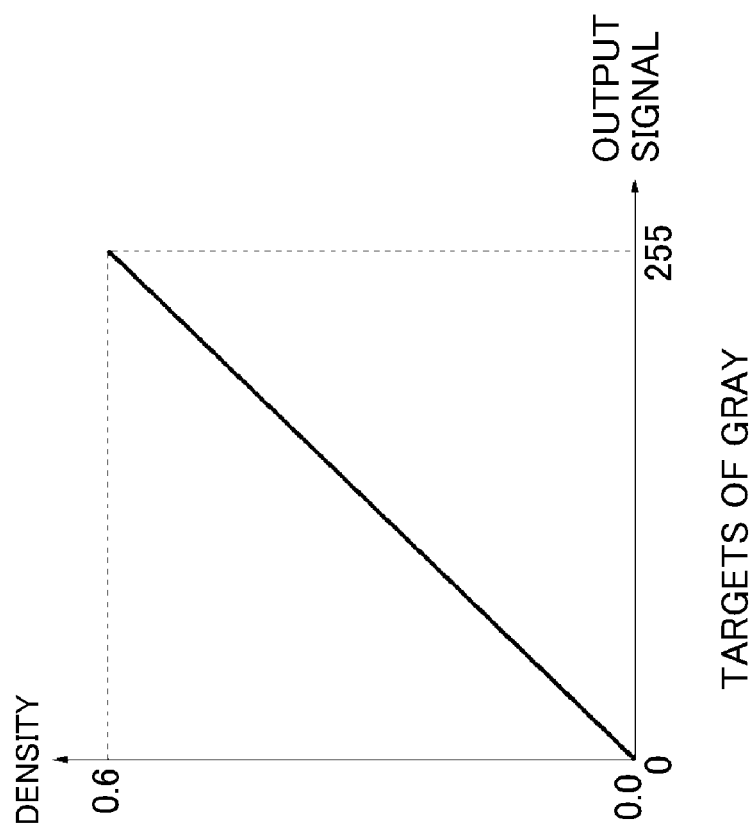

FIGS. 6A and 6B are graphs showing targets of gradation characteristics of the gray toner and the black toner, stored in the LUT forming section 314. The graph is configured based on the above-mentioned reference density values (the solid gray density of 0.6, and the solid secondary color density of 1.8) such that the output signal for the gray toner corresponds to a density of 0.0 to 0.6, while the output signal for the black toner corresponds to a density of 0.6 to 1.8 since the density of the black toner is intended for a density required during formation of a secondary color.

The output gamma-correcting unit 315 performs density correction on an output image, compatible with the image forming apparatus. The output gamma-correcting unit 315 plays the role of maintaining linearity of output image data, which varies with every image formation, based on a one-dimensional lookup table of CMYKG (or CMYK) stored in advance, or a new lookup table sent from the LUT forming section 314.

A halftone processing unit 316 can selectively apply a different type of screening according to an function of the apparatus. In general, the halftone processing unit 316 uses an error-diffusion type screening which can suppress moire, for a copying operation, and a multi-valued screen type screening using a dither matrix because of excellent reproducibility of text data and thin lines, for a printing operation. The former screening is a method which assigns weights to a target pixel and peripheral pixels using error filters to thereby distribute multivalue conversion errors while maintaining the number of gradations, for correction of the errors. On the other hand, the latter is a method which sets multi-valued thresholds of a dither matrix to thereby express pseudo intermediate gradations, and in the present embodiment, performs conversion independently for each of CMYKG, while switching between a small line number and a large line number according to input image data, for reproduction.

Here, a description will be given of the problems which are encountered during formation of a secondary-color patch. As described above, the device-causing in-plane variation includes, for example, variation due to the inclination of the in-developer sleeve with respect to the photosensitive member, variation due to the inclination of the electrostatic charger with respect to the photosensitive member, variation due to the inclination of the intermediate transfer member with respect to the photosensitive member, variation in sensitivity of the photosensitive member, variation in the amount of laser light, and so forth. The density of a secondary-color patch formed by mixing a dark toner and a light toner is adversely affected by in-plane variation due to an image forming unit using the dark toner, and in-plane variation due to an image forming unit using the light toner. To solve these problems, the present invention is directed to forming a high-accuracy LUT (gradation correction data) based on the results of detection of the density of secondary-color patches after eliminating the adverse influences of the in-plane variation therefrom.

Next, a method of forming the LUT according to the present embodiment will be described.

The following description will be given of expression of gradations by the black toner and the gray toner, by way of example.

As described hereinabove, the image forming apparatus according to the present embodiment is capable of expressing secondary-color monochrome gradations using the black toner and the gray toner. Image formation using the gray toner (light toner) and the black toner (dark toner) is executed when the user selects "the secondary color mode" when outputting an image.

When the user selects the secondary color mode, the plate-dividing processing unit 312 plate-divides a K (black) image signal of input (CMYK) image signals into a gray image signal and a black image signal. Then, as shown in FIGS. 4A and 4B, gradation of the input (K) image signal is expressed using only gray until the gradation value of the image signal reaches a certain threshold value, whereas when the gradation value exceeds the certain threshold value, the amount of used gray toner is maximized (to form a solid gray image), and further the black toner is mixed with the solid gray image for expressing the gradations of the input image signal.

The output gamma-correcting unit 315 corrects the output signals from the plate-dividing processing unit 312 in a manner associated with the gray toner and the black toner, respectively, such that the gradation characteristics of an output image become linear, using LUTs associated with the gray toner and the black toner and formed such that a gradation characteristics curve of formed secondary colors becomes a desired one. Then, the output gamma-correcting unit 315 transmits the obtained image signals to the halftone processing unit 316.

In the image forming apparatus according to the present embodiment, the above-mentioned LUTs for the gray toner and the black toner are formed by eliminating the adverse influences of the in-plane variation in the image forming units for the respective toners, based on the results of detection of toner patches. The formation of these LUTs is executed by the LUT forming section 314. Hereinafter, a method of forming the LUTs for the gray toner and the black toner used in the image forming apparatus according to the first embodiment will be described with reference to FIG. 7 and other figures.

FIG. 7 is a flowchart of a LUT forming process executed by the image forming apparatus according to the first embodiment. This LUT forming process is mainly executed by the CPU 301 based on a control program read out from the ROM 303.

First in a step S101, the user selects execution of correction of gradations. Then, in a step S102, the image forming unit 212 is adjusted such that the value of the density of a solid image formed only by the gray toner becomes equal to a predetermined value. The image forming unit 212 is adjusted e.g. by the following method: In order to form a test pattern at a design maximum density (e.g. at an optical density of 1.8) of the image forming apparatus, by a signal associated with a maximum density, the following control is performed: More specifically, a plurality of electrostatic latent images are formed on the photosensitive drum 204 by an exposure device which is set to a fixed exposure amount. The electrostatic latent images are developed as toner images by different developing biases. Then, the plurality of toner images developed with the different developing biases are caused to be read by a density sensor disposed in the vicinity of the intermediate transfer belt, and the densities of the respective toner images are detected according to the results of the reading. One of the developing biases which was used for one of the toner images which was formed at a predetermined density is set to a developing bias to be used for image formation. In the present embodiment, a plurality of electrostatic latent images are formed at a maximized exposure amount (laser light amount), and are developed with different developing biases. Then, out of the different developing biases, one which was used to form one of the toner images developed with the different developing biases, which has a density of a density level (the aforementioned optical density of 1.8), is set to a developing bias used to form an image.

In a step S103, the image forming apparatus adjusts the image forming unit 212 such that the value of a maximum secondary-color density of an image formed by superimposing the black toner on the gray toner becomes equal to a reference value. To adjust the image forming unit 212, the method employed in the step S102 is used, for example.

Figure 8:
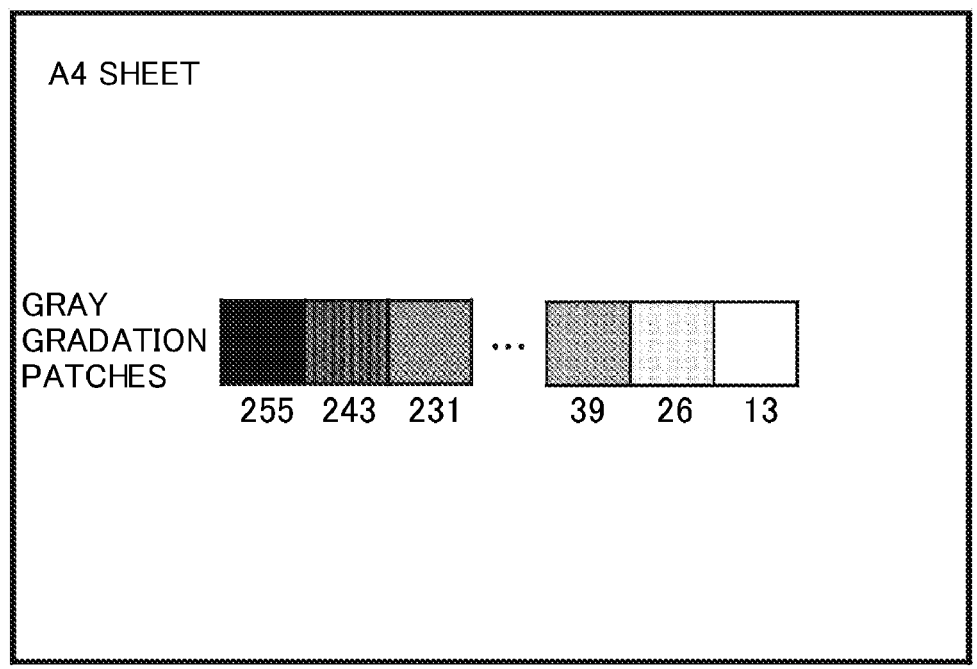
FIG. 8 is a view showing a single color gradation patches of gray used in the gradation correction by the image forming apparatus according to the first embodiment.

In a step S104, the image forming unit 212 performs image formation in an OFF state of the LUT, i.e. without performing gradation correction on image data for forming gradation patches. As shown in FIG. 8, 20-gradation patches of a single color of gray are output to an A4 sheet along the longer sides of the sheet. The direction along the longer sides of the sheet is a direction orthogonal to a sheet conveying direction. It should be noted that the number of gradations may be increased by taking image-forming accuracy and the characteristics of the image forming unit 212 into account. Further, the use of a reduced number of patches from the viewpoint of consumption of toner is also within the scope of the present invention.

Figure 9:
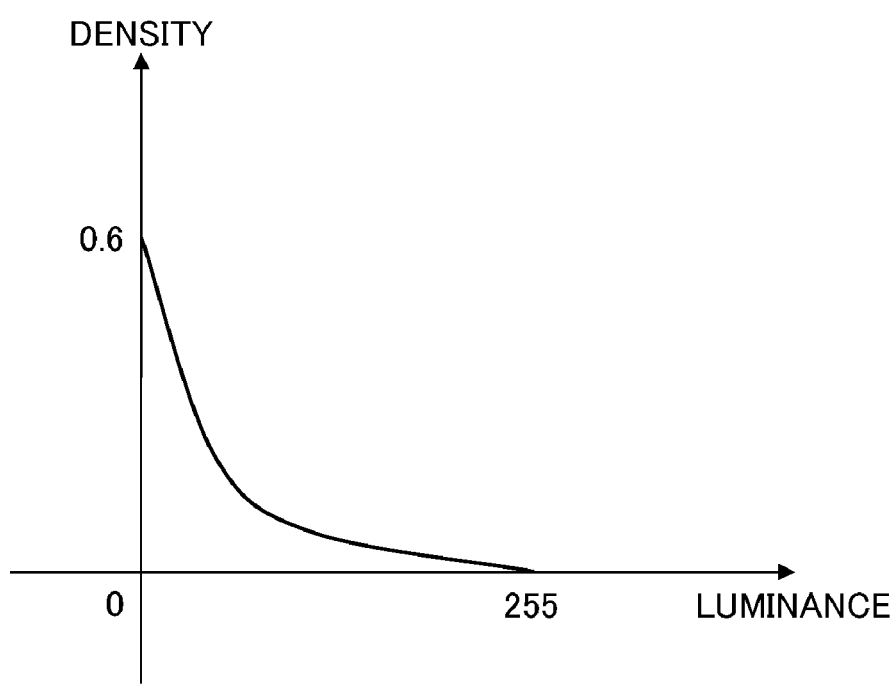
FIG. 9 is a view of a single color luminance-density conversion table used in the image forming apparatus according to the first embodiment.

In a step S105, the user sets the original sheet having the patches output thereto on the image reading unit (reader unit) 211. The image reading unit 211 read the luminance of each gray gradation patch, and the LUT forming section 314 converts the luminance of green of the RGB luminance information read by the image reading unit 211 to density information using the luminance-density conversion table stored in the LUT forming section 314, to thereby obtain the density information on the gray gradation patches. Although in the present embodiment, the luminance of green of the ROB luminance information read by the image reading unit 211 is used, the luminance used is changed depending on a color on which gradation correction is to be performed. To correct the gradation of cyan, the luminance of red is selected. To correct the gradation of magenta, the luminance of green is selected. For yellow, the luminance of blue is selected, and for black, the luminance of green is selected. Further, the above-mentioned luminance-density conversion table is a table for a single color, as shown in FIG. 9.

Figure 10:
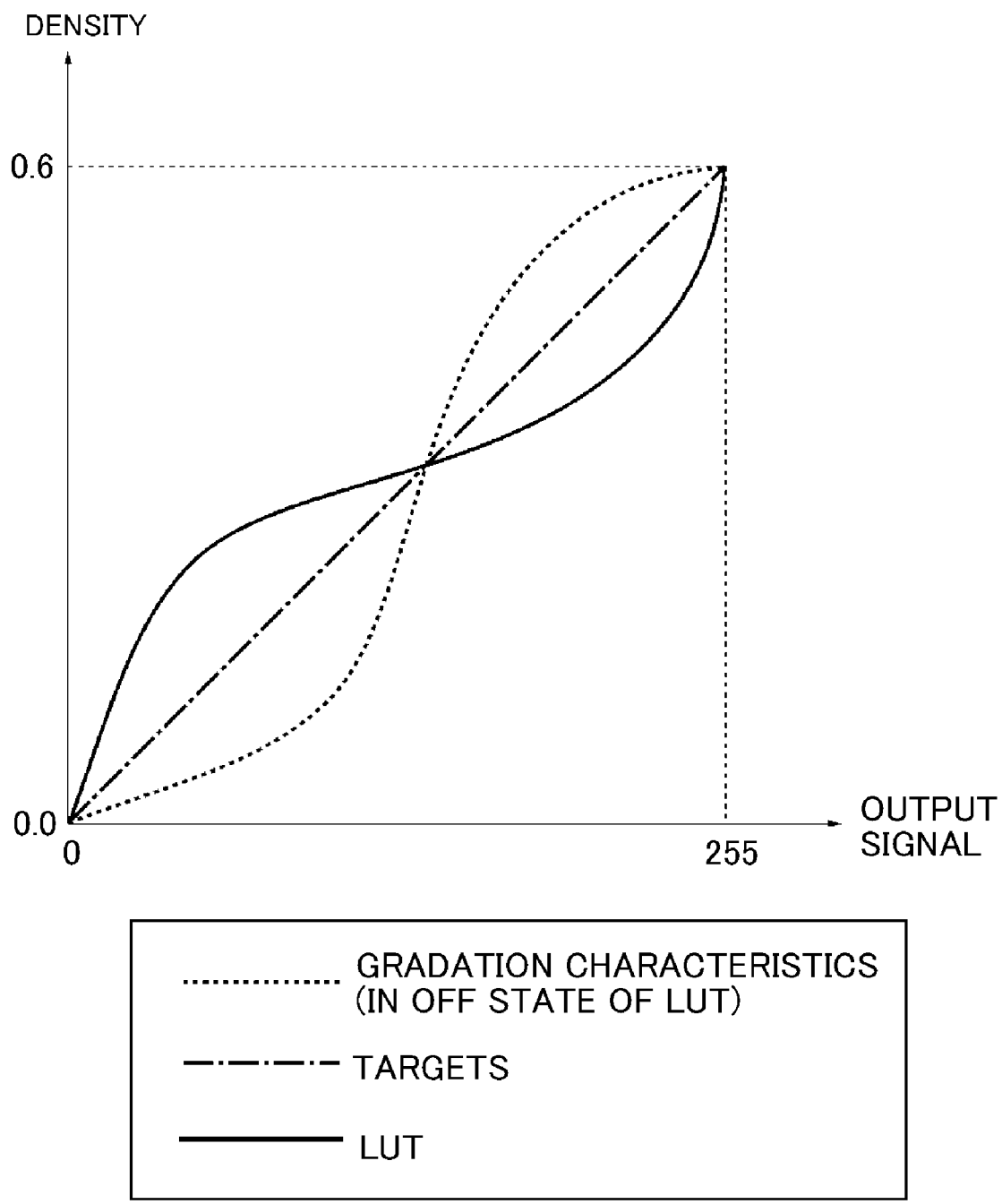
FIG. 10 is a graph showing the relationship between a LUT, the gradation characteristics of gray in an OFF state of the LUT, and a target of gray.

In a step S106, the LUT forming section 314 forms a gradation correction table for the gray toner, i.e. a gray toner LUT, based on the targets of the gradation characteristics of the gray toner, stored therein, and the converted density information. The LUT is obtained e.g. by line-symmetrically converting the converted density information with respect to the target density of the gray toner. As a consequence, the relationship between the formed LUT, the original gradation characteristics of the gray toner in the OFF state of the LUT, and the target density is as shown in FIG. 10.

As described above, the LUT forming method which is executed in the steps S104 to S106 for correcting the gradation of the output image in a density region where image formation is performed using only the gray toner is the same as the conventional one-dimensional LUT forming method for forming the LUT for a single color. Therefore, from the viewpoint of enhancement of accuracy in forming a secondary-color LUT in the next step, gradation correction is carried out which eliminates the adverse influences of in-plane variation of a single color, as disclosed in Japanese Patent Laid-Open Publication No. 2001-260407.

Figure 11:
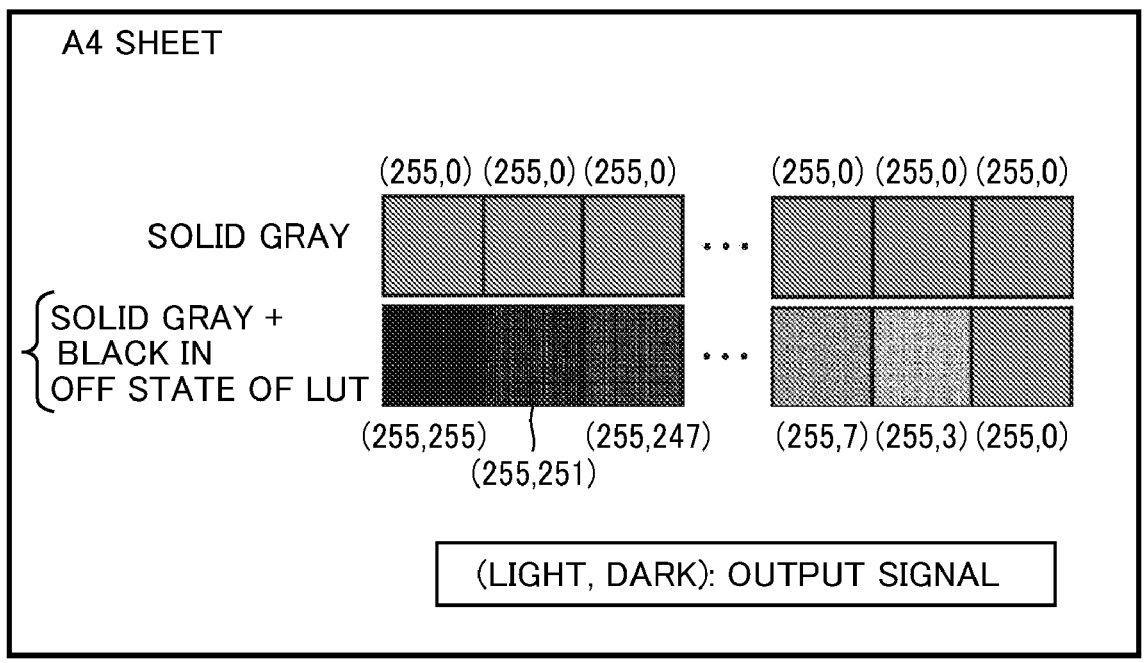
FIG. 11 is a view showing a secondary-color LUT-forming chart used by the image forming apparatus according to the first embodiment.

In a step S107, as shown in FIG. 11, a patch image signal is generated from a patch format in which solid gray patches (first patch group) and secondary-color patches (second patch group) which are formed by adding black at gradation levels in the OFF state of the LUT to the solid gray are arranged adjacent to each other. The solid gray patches form a patch group that is formed to detect density variation in an image, produced along the direction of the rotating shaft of the photosensitive drum 204. The secondary-color patches are a group of patches formed for the purpose of forming a LUT for the black toner. These groups of patches cause a secondary-color LUT-forming chart corresponding to the patch image signal to be output onto an A4 sheet along the longer sides of the sheet a long side thereof.

In a step S108, the image reading unit 211 is caused to read the secondary-color LUT-forming chart that is set by the user in the image reading unit 211. The image reading unit 211 reads from the chart information on the luminance of green out of the luminance information corresponding to the secondary-color patches and the solid gray patches.

In a step S109, the LUT forming section 314 calculates a correction value X for correcting in-plane variation occurring along the rotating shaft of the photosensitive drum 204, from the information on the luminance (hereinafter represented by I) of the solid gray patches. Further, the LUT forming section 314 calculates the I black (i) based on the information on the luminance of the secondary-color patches. This calculation is performed as follows:

The read luminance I secondary color (i) of the secondary-color patches is composed of the luminance of gray and that of black. Here, the above-described subscript i represents a patch number, and i=1 to N holds, wherein N is equal to the total sum of the secondary colors. The LUT forming section 314 regards the luminance of gray included in the secondary-color patches approximately equal to the luminance I solid gray (i) of the solid gray patches adjacent to the respective secondary-color patches. Then, the LUT forming section 314 calculates the luminance I black (i) of black included in the secondary-color patches, from the luminance information, by the following equation (1). In other words, the LUT forming section 314 corrects read information on the secondary color in the secondary-color patches.

$$I\ black\ (i) = I\ secondary\ color\ (i) - I\ solid\ gray\ (i) - correction\ value\ X \qquad (1)$$

In the above equation (1), the luminance is obtained by subtracting the luminance of gray including the in-plane variation and the correction value X from the luminance of the secondary-color patches, to thereby extract the luminance of black contained in the secondary-color patches. This prevents the luminance of black from including the influence of the in-plane variation of gray.

In a step S110, the LUT forming section 314 converts the calculated luminance information to density information using a luminance-density conversion table, and forms a black toner LUT in which the factor of the secondary color is incorporated, based on the obtained density information and the output signals. As a consequence, the relationship between the formed LUT, the gradation characteristics of the black toner in the OFF state of the LUT, and the target density is as shown in FIG. 12.

Figure 12:
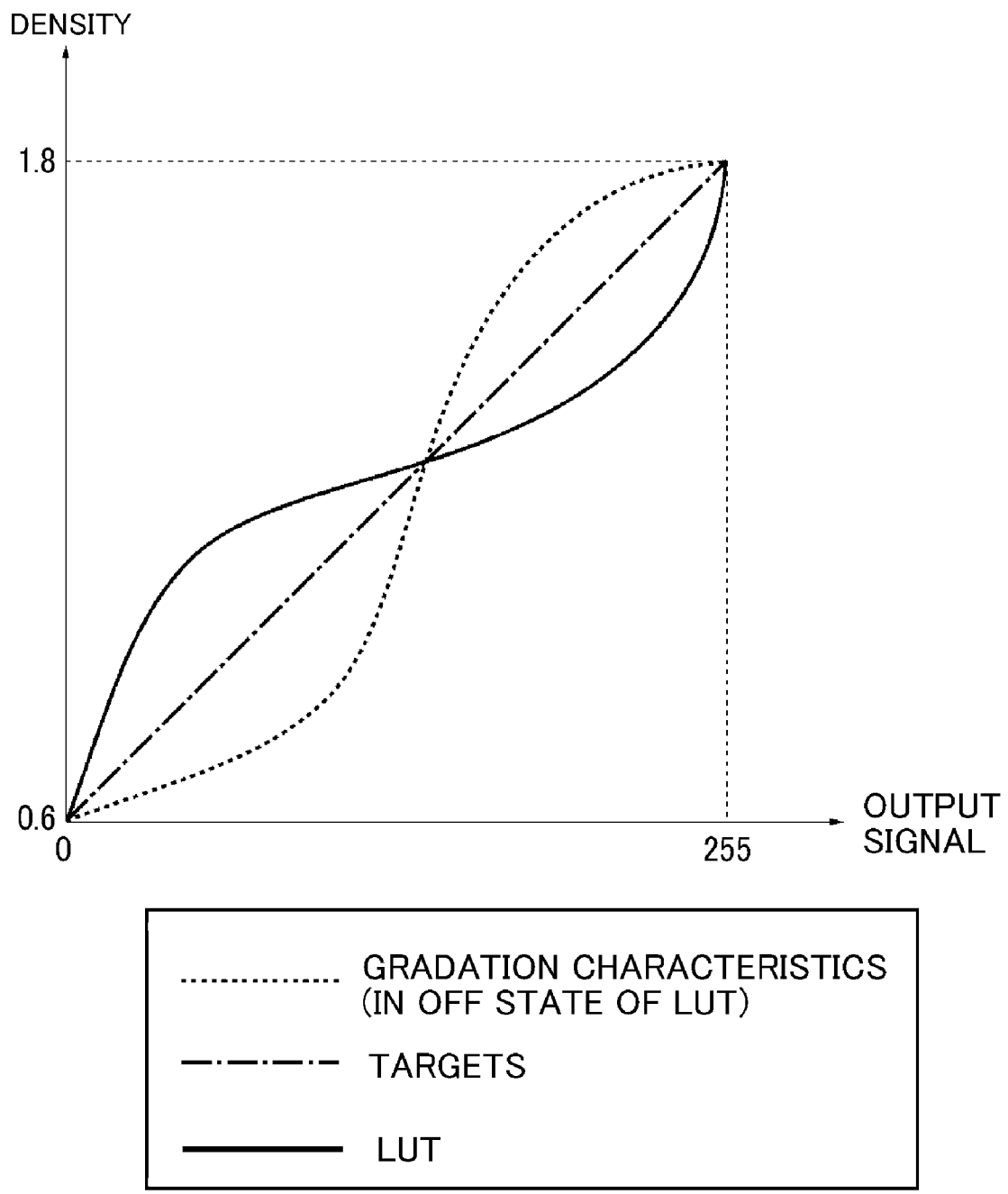
FIG. 12 is a graph showing the relationship between a LUT, the gradation characteristics of black in an OFF state of the LUT, and a target of black.

The gradation correction of the black toner is performed aiming at the density thereof exhibited in forming the secondary color, and hence the vertical axis representing density in the FIG. 12 graph covers a range of densities from 0.6 to 1.8. Further, as shown in FIG. 13, the luminance-density conversion table used in the step S10 is one for the secondary color, in which the densities of the secondary-color patches and the values of the luminance of black in the secondary-color patches calculated by the above equation (1) are associated with each other.

In a step S11, the LUT forming section 314 uploads the thus determined LUTs for gray and black to the output gamma-correcting unit 315. Thus, the LUT forming process is completed.

The gradation correction method executed by the image forming apparatus according to the present embodiment makes it possible not only to maintain the gradation characteristics of the secondary color formed by the dark/light toner but also to form a LUT which is not adversely affected by the in-plane variation of gray contained in the secondary-color patches to be detected, due to the image forming unit for the gray toner. This method makes it possible to form a LUT associated with the dark toner with high accuracy.

In the above-described first embodiment, the description has been given of the LUT forming method for forming the LUT while eliminating the adverse influence of the in-plane variation contained in the color (gray) of lower layers of the secondary-color patches. In a second embodiment, a description will be given of a LUT forming method that is improved in correction accuracy by eliminating not only the adverse influence of the in-plane variation of the color of the lower layers of the secondary-color patches but also the adverse influence of in-plane variation contained in the color (black) of the upper layers of the secondary-color patches.

The image forming apparatus according to the present embodiment has the same construction as that of the image forming apparatus according to the first embodiment described hereinabove.

Hereinafter, a description will be given of a gradation correction method executed by the image forming apparatus according to the second embodiment.

The gradation correction method executed by the image forming apparatus according to the first embodiment for correcting the gradation of the secondary color calculates the luminance of black in the secondary-color patches by subtracting a value of the luminance of each gray patch from a value of the luminance of the associated secondary-color patch. Although the thus calculated luminance does not include the adverse influence of the in-plane variation contained in gray, in-plane variation is also caused in the image forming unit for the black toner. This makes it impossible for the first embodiment to accurately form the LUT in which the adverse influence of the in-plane variation is eliminated. In the present embodiment, a description will be given of a LUT forming method which is also capable of eliminating the adverse influence of the in-plane variation caused by the image forming unit for the black toner.

Before forming the LUT, the LUT forming section 314 stores in advance the targets of gradation characteristics of gray and black, as described hereinafter.

FIGS. 14A to 14C are graphs showing the targets of the gradation characteristics of the gray and black toners, which are stored in the LUT forming section 314.

As for the gray toner, the targets of the gradation characteristics thereof are configured such that a density of 0.0 to 0.6 is output according to an output signal, based on a reference value (0.6 in the present embodiment) of the solid density of the gray toner.

On the other hand, as for the black toner, the LUT forming section 314 stores two kinds of targets of gradation characteristics, i.e. targets for the secondary color and targets for the single color, with respect to values of the output signal. The targets for the secondary color are configured such that a density of 0.6 to 1.8 is output based on a reference value (1.8 in the present embodiment) of the density of the solid secondary color. Further, the targets for the single color are configured such that a density of 0.0 to 1.8 is output, for a density of the black toner as the single color.

The maximum density value (1.8) of the targets for the single color is defined as a density value of solid black as the single color, which is output to a sheet after the density of the solid black is adjusted by the image forming unit 212 such that the density of a solid secondary color formed by mixing the solid black with solid gray having a reference density value becomes equal to a reference value.

Next, a gradation correction process executed by the image forming apparatus according to the present embodiment will be described.

FIG. 15 is a flowchart of the gradation correction process executed by the image forming apparatus according to the second embodiment. This process is mainly executed by the CPU 301 based on a control program read from the ROM 303.

Processing at steps S200 to S206 in FIG. 15 are identical to processing at the steps S100 to S106 in FIG. 7 (the gradation correction method executed by the image forming apparatus according to the first embodiment), and therefore description thereof is omitted.

Figure 16:
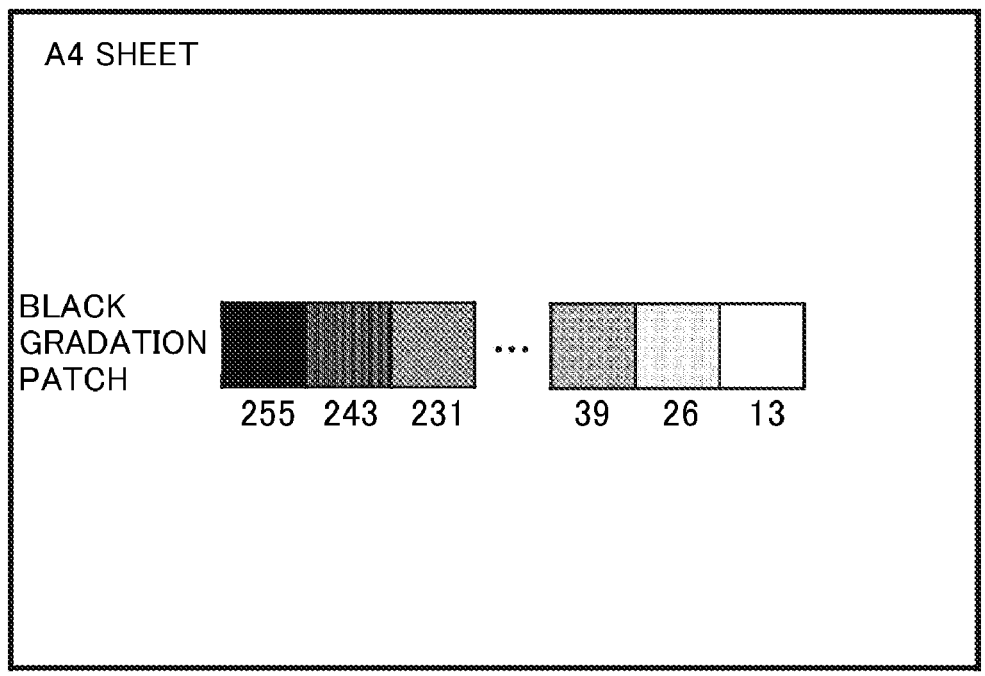
FIG. 16 is a view showing a single color gradation patches of black, which is used in the image forming apparatus according to the second embodiment.

In a step S207, as shown in FIG. 16, 20-gradation patches of a single color of black (third patch group) are output to an A4 sheet along the longer sides of the sheet in the OFF state of the LUT in which the image forming unit 212 is in its original state before executing gradation correction. In doing this, the number of gradations may be increased by taking image-forming accuracy and the characteristics of the image forming unit 212 into account. Further, it is to be understood that the use of a reduced number of patches from the viewpoint of consumption of toner is also within the scope of the present invention.

Figure 17:
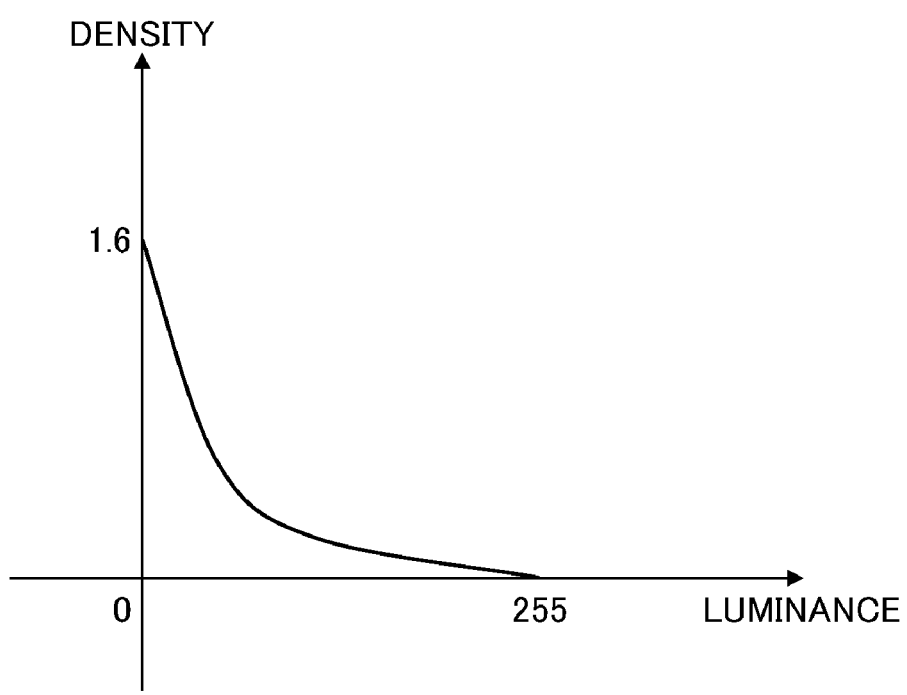
FIG. 17 is a view of a single color luminance-density conversion table used in the image forming apparatus according to the second embodiment.

In a step S208, the image reading unit 211 is caused to read the above-described black gradation patches which are drawn on a sheet set by the user on the image reading unit 211. The image reading unit 211 read the luminance of each black gradation patch, and the LUT forming section 314 converts the luminance of green of the RGB luminance information read by the image reading unit 211 to density information using the luminance-density conversion table, to thereby obtain the density information on the black gradation patches. Here, the above-mentioned luminance-density conversion table is one for the single color, as shown in FIG. 17.

Figure 18:
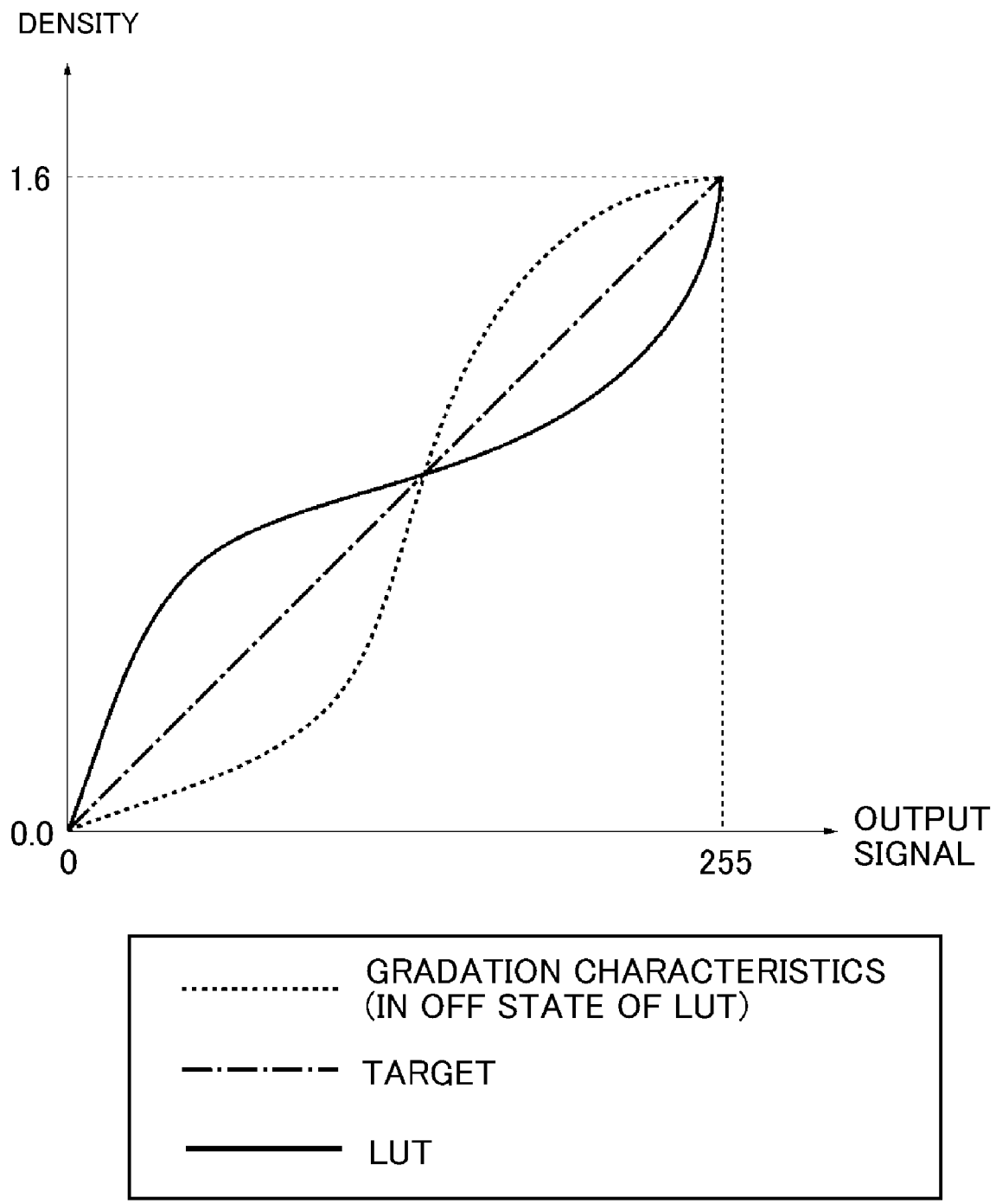
FIG. 18 is a graph showing the relationship between a LUT, the gradation characteristics of black in an OFF state of the LUT, and a target of black.

In a step S209, the LUT forming section 314 forms a gradation correction table for the black toner, i.e. a black toner LUT, based on the targets of the gradation characteristics of the black toner and the converted density information. The targets used here are those for the single color black, shown in FIG. 14C. As a consequence, the relationship between the formed LUT, the original gradation characteristics of the black toner in the OFF state of the LUT, and the targets is as shown in FIG. 18.

Figure 19:
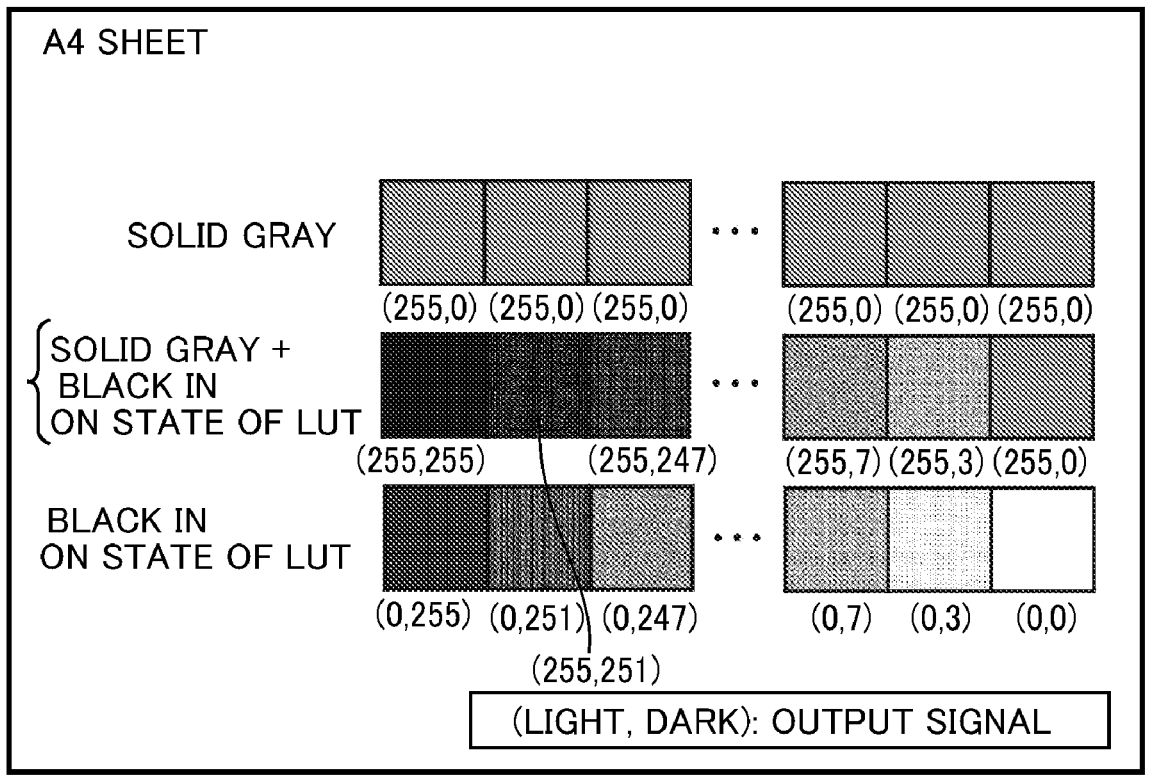
FIG. 19 is a view showing a secondary-color LUT-forming chart used in the image forming apparatus according to the second embodiment.

Next, in a step S210, as shown in FIG. 19, a secondary-color gradation correction chart is output to an A4 sheet along the longer sides of the sheet. In this chart, solid gray patches, secondary-color patches which are formed by adding black at gradation levels in the ON state of the LUT to the solid gray, and black gradation patches in the ON state of the LUT are arranged adjacent to each other.

In a step S211, the image reading unit 211 reads the above-described chart printed on a sheet set thereon by the user. More specifically, the image reading unit 211 reads luminance information on the secondary-color patches, the solid gray patches, and the black gradation patches.

In a step S212, the LUT forming section 314 calculates the luminance I black (i) of black in the secondary-color patches from the above luminance information, by the aforementioned equation (1).

Although this luminance does not include in-plane variation of gray, if black includes in-plane variation, the luminance comes to include the in-plane variation of black. To eliminate this inconvenience, in the present embodiment, the following process is carried out in a step S213.

In the step S213, the LUT forming section 314 grasps the in-plane variation of black based on the read luminance information on the black gradation patches output in the ON state of the LUT in FIG. 19, and corrects the output signal value of black in the secondary-color patches.

Figure 20:
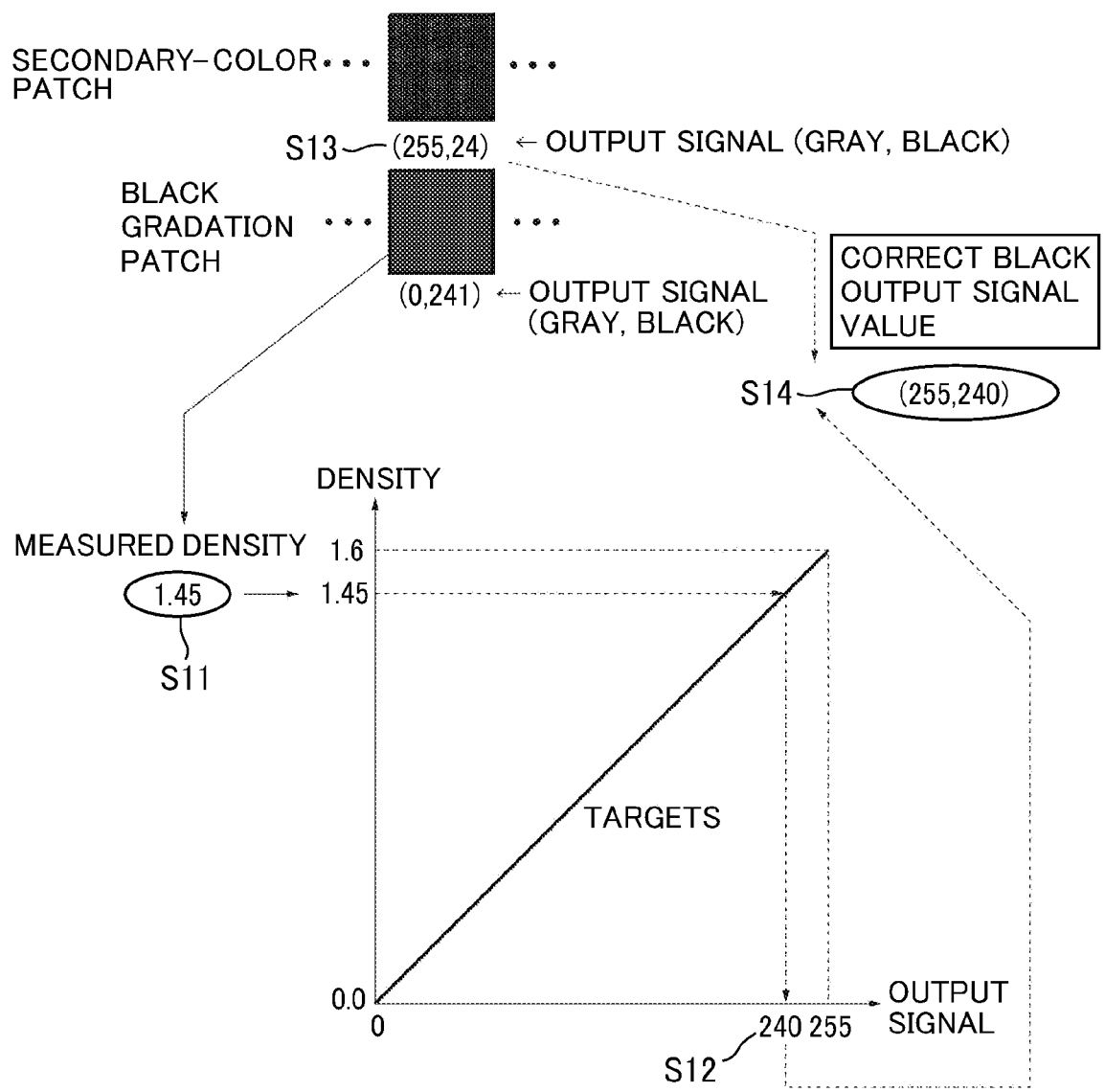
FIG. 20 is a view useful in explaining a process for correcting an output signal value of black in secondary-color patches.

FIG. 20 is a view useful in explaining a process for correcting the output signal value of black in the secondary-color patches. In this process, the LUT forming section 314 grasps the in-plane variation of black based on the luminance information on the black gradation patches, and based on the grasped in-plane variation of black, corrects the output signal value of the black in the secondary-color patches.

The LUT forming section 314 converts the luminance of each black gradation patch read by the image reading unit 211 to density information using the FIG. 17 luminance-density conversion table for the single color, to thereby obtain the density of the black gradation patch (S11 in FIG. 20).

Figure 21:
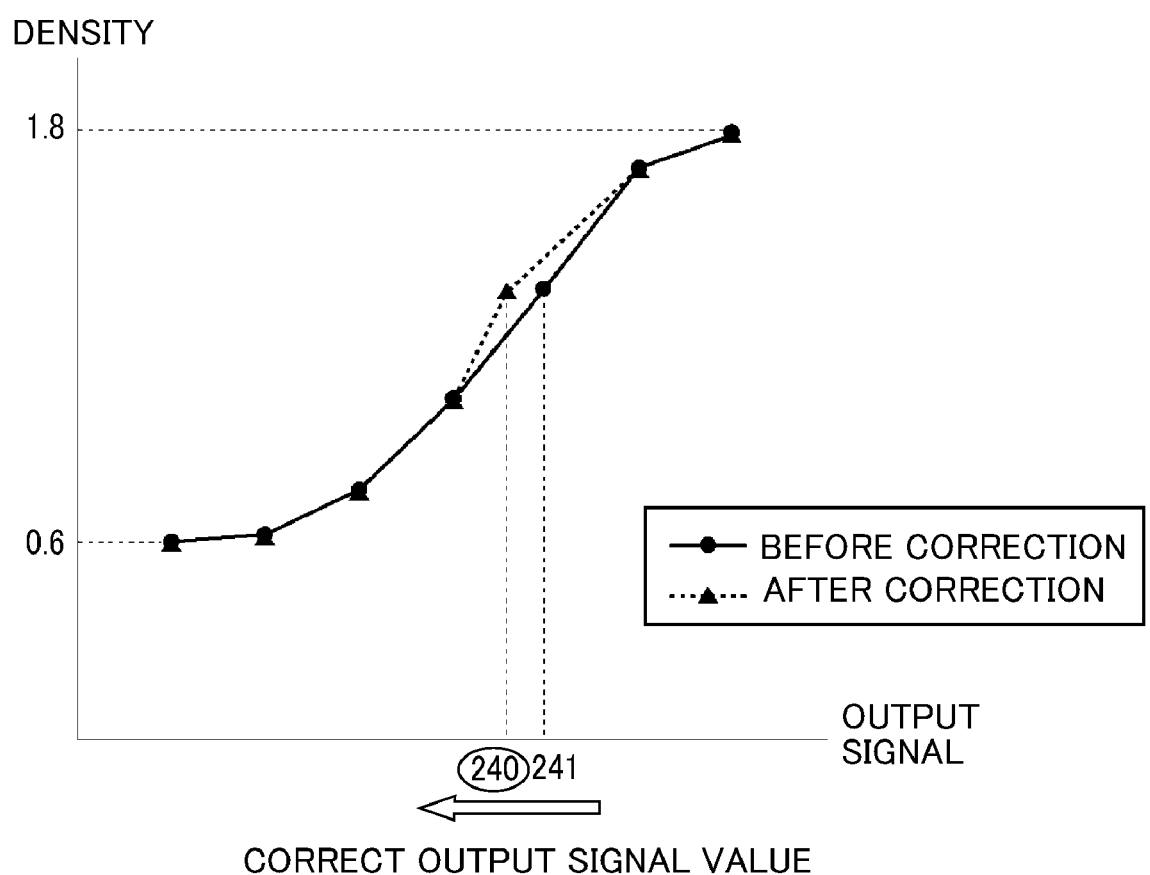
FIG. 21 is a graph showing gradation characteristics of black in the OFF state of the LUT after correction of the output signal value.
Figure 22A:
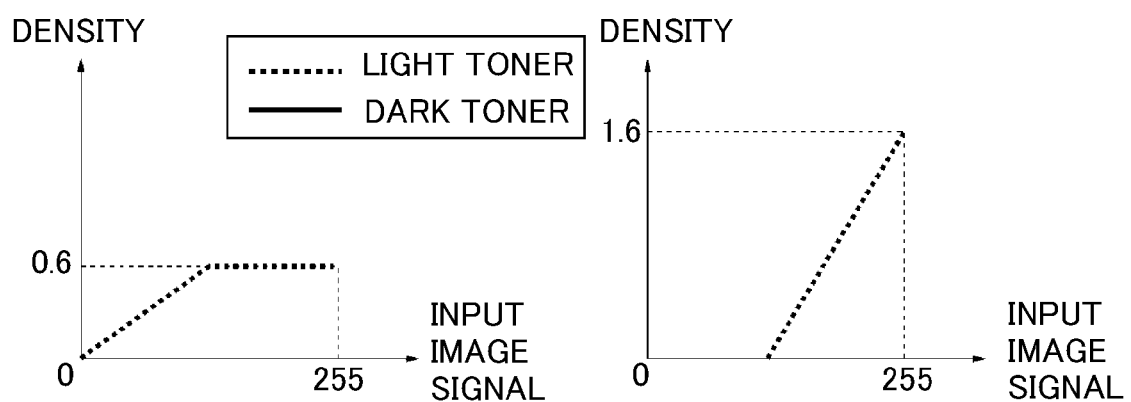
FIGS. 22A and 22B are graphs showing how a gradation step is caused in expressing a gradation using a dark toner and a light toner.
Figure 22B:
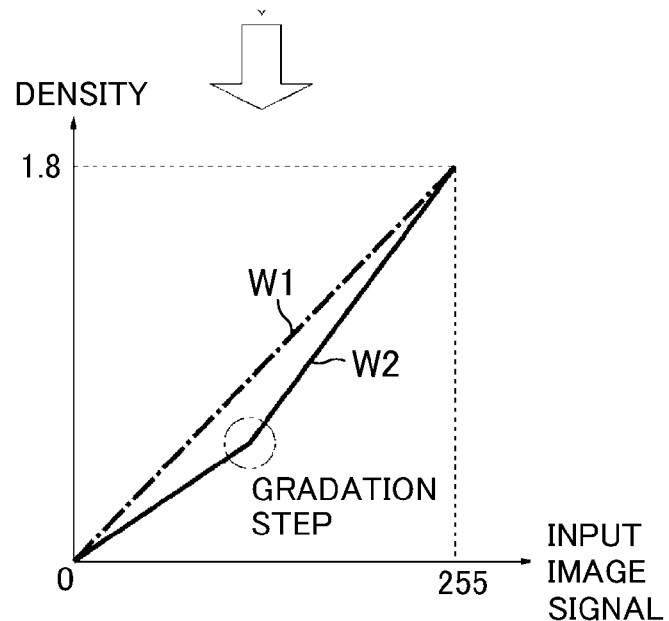

Next, the output signal value corresponding to the density value of the patch is referred to using the targets (S12 in FIG. 20). The targets used here are the FIG. 14C targets for the single color. The difference between the output signal value obtained from the corresponding target and the original output signal value is considered to be caused by in-plane variation, and the output signal value of black in the secondary-color patch (S13 in FIG. 20) is changed (corrected) to the output signal value obtained using the target (S14 in FIG. 20). This correction changes the gradation characteristics in the OFF state of the LUT as shown in FIG. 21. The above-described steps are all carried out on all the secondary-color patches.

A combination of the thus obtained luminance of black in the secondary-color patches and the corrected output signal value does not include the adverse influences of the in-plane variations of grey and black. The LUT forming process in the present embodiment, which forms a LUT based on the above information items, makes it possible to form the LUT such that it is more free from adverse influence of the in-plane variations than the LUT formed by the LUT forming process executed in the first embodiment.

In a step S214, the LUT forming section 314 converts the luminance of black in each secondary-color patch, calculated in the step S212, to the density of black using the FIG. 13 luminance-density conversion table for the secondary color, and a LUT for black is formed using the obtained density and the output signal value corrected in the step S213. The targets used here are the FIG. 14A targets for the secondary color. As a consequence, the relationship between the formed LUT, the gradation characteristics of the black toner in the OFF state of the LUT, and the targets is as shown in FIG. 12.

In a step S215, the LUT forming section 314 uploads the thus determined LUT for the gray toner and LUT for the black toner to the output gamma-correcting unit 315. Thus, the LUT forming process is completed.

In the second embodiment, the gradation correction method is distinguished from the gradation correction method described in the first embodiment, in that it grasps not only the in-plane variation of the color (gray) of the lower layer of each secondary-color patch but also the in-plane variation of the color (black) of the upper layer thereof to thereby correct the output signal value of the color of the upper layer. This makes it possible to form a LUT which is more free from the adverse influence of the in-plane variation, i.e. which is improved in accuracy. That is, it is possible to perform gradation correction while preventing not only the in-plane variation of gray but also the in-plane variation of black, thereby making it possible to form more accurate LUTS.

It should be noted that although in the first and second embodiments, the description has been given of the methods of forming the LUTs for the dark and light toners which are not adversely affected by the in-plane variations, the combination of colors is not limited to the combination of gray and black mentioned in the above-described embodiments, but it is to be understood that a combination of cyan and light cyan and a combination of magenta and light magenta are also within the scope of the present invention. Further, although in the first and second embodiments, the density of each patch is determined by the luminance of the patch read from the image reading unit 211 of the image forming apparatus, this is not limitative, but it may be directly determined using a density meter or a spectrophotometer.

It is to be understood that the present invention may also be accomplished by supplying a system or an apparatus with a storage medium in which a program code of software, which realizes the functions of each of the above described embodiments, is stored, and causing a computer (or CPU or MPU) of the system or apparatus to read out and execute the program code stored in the storage medium.

In this case, the program code itself read from the storage medium realizes the functions of each of the above described embodiments, and therefore the program code and the storage medium in which the program code is stored constitute the present invention.

Examples of the storage medium for supplying the program code include a floppy (registered trademark) disk, a hard disk, a magnetic-optical disk, optical disks, such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network.

Further, it is to be understood that the functions of each of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-317213 filed Dec. 7, 2007, which is hereby incorporated by reference herein in its entirety.

What is claimed is:

1. An image forming apparatus that forms an image having a density lower than a predetermined density by using only a toner of a first color while forming an image having a density not lower than the predetermined density by superimposing the toner of the first color and a toner of a second color that has the same hue as that of the first color and has a density higher than that of the first color, one upon the other, comprising:

an image processing unit configured to convert an input image signal based on gradation correction data so as to adjust gradation of an output image;

an image forming unit configured to perform image formation based on an image signal output from said image processing unit, said image forming unit including an image bearing member, a driving unit configured to drivingly rotate said image bearing member, an exposure unit configured to form an electrostatic latent image on said image bearing member, a toner bearing member disposed in opposed relation to said image bearing member and configured to bear a toner, a bias applying unit configured to apply a developing bias to said toner bearing member, and a developing unit configured to develop the electrostatic latent image into a toner image at a density corresponding to a potential difference between the developing bias and a potential of the electrostatic latent image, said image forming unit including a first image-forming section for performing image formation using the toner of the first color and a second image-forming section for performing image formation using the toner of the second color;

a control unit configured to cause said image forming sections to form a first toner pattern having a uniform density and a second toner pattern having gradation, in a direction orthogonal to a direction of driving said image bearing member;

a reader unit configured to read the first and second toner patterns;

a detection unit configured to detect an image density difference occurring in the direction orthogonal to the direction of driving said image bearing member, based on a result of reading of the first toner pattern by said reader unit;

a calculation unit configured to calculate density information on the second toner pattern, based on a result of detection by said detection unit and a result of reading of the second toner pattern; and a gradation correction data-forming unit configured to form gradation correction data based on the density information, wherein said gradation correction data-forming unit forms gradation correction data for converting an input image signal associated with the toner of the second color, based on density information on the second toner pattern formed by the toners of the first color and the second color, and density information on the second toner pattern formed by the toner of the first color.

2. An image forming apparatus that forms an image having a density lower than a predetermined density by using only a toner of a first color while forming an image having a density not lower than the predetermined density by superimposing the toner of the first color and a toner of a second color that has the same hue as that of the first color and has a density higher than that of the first color, one upon the other, comprising:

an image processing unit configured to convert an input image signal based on gradation correction data so as to adjust gradation of an output image;

an image forming unit configured to perform image formation based on an image signal output from said image processing unit, said image forming unit including an image bearing member, a driving unit configured to drivingly rotate said image bearing member, an exposure unit configured to form an electrostatic latent image on said image bearing member, a toner bearing member disposed in opposed relation to said image bearing member and configured to bear a toner, a bias applying unit configured to apply a developing bias to said toner bearing member, and a developing unit configured to develop the electrostatic latent image into a toner image at a density corresponding to a potential difference between the developing bias and a potential of the electrostatic latent image, said image forming unit including a first image-forming section for performing image formation using the toner of the first color and a second image-forming section for performing image formation using the toner of the second color;

a control unit configured to cause said image forming sections to form a first toner pattern having a uniform density and a second toner pattern having gradation, in a direction orthogonal to a direction of driving said image bearing member;

a reader unit configured to read the first and second toner patterns;

a detection unit configured to detect an image density difference occurring in the direction orthogonal to the direction of driving said image bearing member, based on a result of reading of the first toner pattern by said reader unit;

a calculation unit configured to calculate density information on the second toner pattern, based on a result of detection by said detection unit and a result of reading of the second toner pattern; and a gradation correction data-forming unit configured to form gradation correction data based on the density information, wherein said gradation correction data-forming unit forms gradation correction data for converting an input image signal associated with the toner of the second color, based on density information on the second toner pattern formed by the toners of the first color and the second color and the image density difference detected by said detection unit of the first toner pattern formed by the toner of the first color.

* * * * *